United States Patent [19]
Awdeh et al.

[11] Patent Number: 5,991,268
[45] Date of Patent: Nov. 23, 1999

[54] FLOW CONTROL MECHANISM OF ABR TRAFFIC IN ATM NETWORKS

[75] Inventors: Ra'ed Y. Awdeh, Ottawa; John Frank Pillar, Nepean, both of Canada

[73] Assignee: Nortel Networks Corporation, Montreal, Canada

[21] Appl. No.: 08/889,186

[22] Filed: Jul. 7, 1997

[51] Int. Cl.$^6$ .................................................. H04L 12/26
[52] U.S. Cl. .......................... 370/232; 370/253; 370/395; 370/235
[58] Field of Search .................................. 370/229–238, 370/395, 465, 468, 253

[56] References Cited

U.S. PATENT DOCUMENTS

| | | | |
|---|---|---|---|
| 5,737,313 | 4/1998 | Kilarov et al. | 370/236 |
| 5,748,901 | 5/1998 | Kline et al. | 370/253 |
| 5,754,530 | 5/1998 | Awdeh et al. | 370/234 |
| 5,777,984 | 6/1998 | Gun et al. | 370/409 |
| 5,805,577 | 9/1998 | Jain et al. | 370/253 |
| 5,812,527 | 9/1998 | Kline et al. | 370/253 |

OTHER PUBLICATIONS

"ATM Forum Traffic Management Specification, Version 4.0" (Draft), S.S. Sathaye, ATM Forum/95–00113R9, Dec. 1995.
"Enhanced PRCA (Proportional Rate–Control Algorithm)", L. Roberts, ATM Forum/94–0735R1, Aug. 1994.
"NIST ER Switch Mechanism (An Example)", N. Golmie et al., ATM Forum/95–0695, Jun. 1995.
"Intelligent Congestion Control for ABR Service in ATM Networks", K. Y. Siu and H.–Y. Tzeng, Computer Communication Review, vol. 24, No. 4, pp. 81–106, Oct. 1995.
"Example Switch Algorithm for Section 5.4 of TM Spec.", A. Barnhart, ATM Forum/95–0195, Feb. 1995.
"A Sample Switch Algorithm", R. Jain et al., ATM Forum/95–0178R1, Feb. 1995.
"ERICA+: Extensions to the ERICA Switch Algorithm", R. Jain et al., ATM Forum/95–1346, Oct. 1995.
"The Rate–Based Flow Control Framework for the Available Bit Rate ATM Service", F. Bonomi and K. Fendick, IEEE Network, vol. 9, No. 2, pp. 25–39, Mar./Apr. 1995.

*Primary Examiner*—Chi H. Pham
*Assistant Examiner*—Ricky Q. Ngo
*Attorney, Agent, or Firm*—Gowling, Strathy & Henderson; Yoshiharu Toyooka

[57] ABSTRACT

An ATM network carries several categories of services, each having its own traffic characteristics and performance requirements. The ABR (available bit rate) service category is the only existing one suited for high-reliability data communications, such as file transfer, LAN emulation, etc. The invention relates to the control of ABR traffic flow in an ATM network, to quickly utilize the bandwidth left unused by higher priority service categories while minimizing ABR cell loss, and maintaining fairness among ABR connections. On each ABR connection, the source end system periodically sends RM (resource management) cells to the corresponding destination end system which loops them back to the source. The ATM network may instruct the ABR sources of the exact rates it can support by modifying a certain field in the RM cells. The invention relates to techniques of deriving the proper explicit cell rate for each ABR connection which can grow to a fair level even under special conditions.

16 Claims, 13 Drawing Sheets

RM (Resource Management) Cell Format [1]

| FIELD | | OCTET | BIT(s) | NAME |
|---|---|---|---|---|
| Header | | 1-5 | all | ATM Header |
| ID | | 6 | all | Protocol ID |
| Type | DIR | 7 | 8 | Direction |
| | BN | 7 | 7 | BECN Cell |
| | CI | 7 | 6 | Congestion Indication |
| | NI | 7 | 5 | No Increase |
| | RA | 7 | 4 | Request/Acknowledge |
| | | 7 | 3-1 | Reserved |
| ER | | 8-9 | all | Explicit Cell Rate |
| CCR | | 10-11 | all | Current Cell Rate |
| MCR | | 12-13 | all | Minimum Cell Rate |
| QL | | 14-17 | all | Queue Length |
| SN | | 18-21 | all | Sequence Number |
| Reserved | | 22-51 | all | Reserved |
| Reserved | | 52 | 16-11 | Refer to I.371 |
| CRC-10 | | 52-53 | 10-1 | Refer to I.371 |

FIG. 1

| Field | Set by source to | May be altered by switches | May be altered by destinations |
|---|---|---|---|
| DIR | 0 | no | yes, should be (to 1) |
| MCR | ACR | no | no |
| ER | PCR (typically) | yes (reduced) | yes (reduced) |

FIG. 2

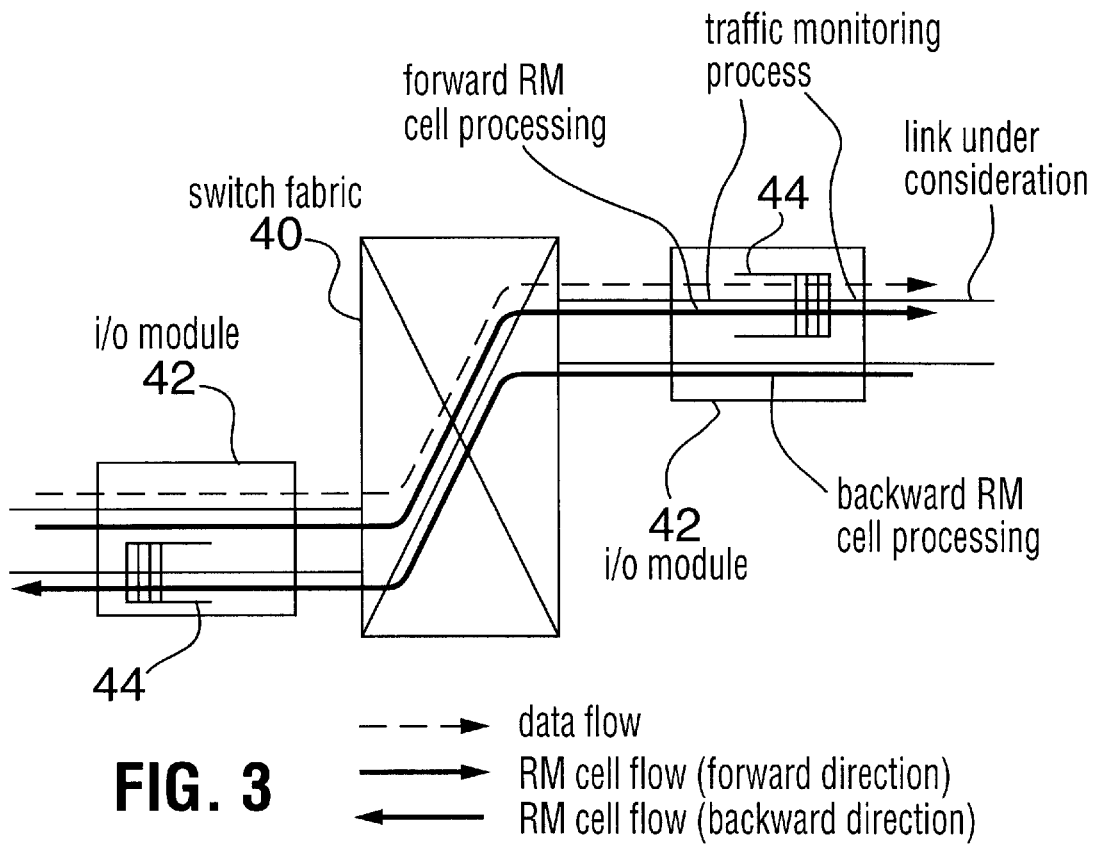
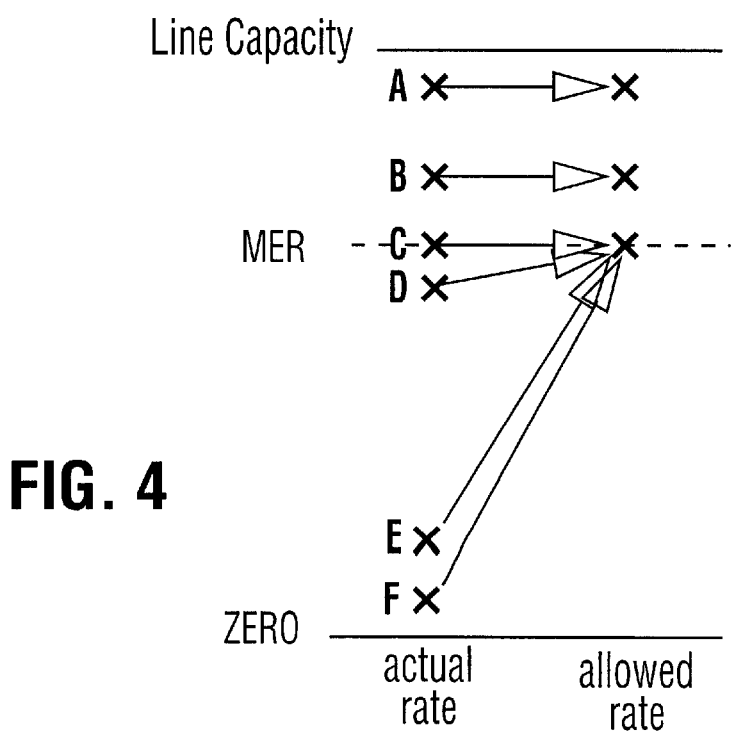
FIG. 3
— — → data flow
⎯⎯→ RM cell flow (forward direction)
←⎯⎯ RM cell flow (backward direction)
FIG. 4

FLOW CONTROL MECHANISM OF ABR TRAFFIC IN ATM NETWORKS

FIELD OF THE INVENTION

This invention relates generally to a flow control mechanism in a connection-oriented packet-switched network. In particular, it is directed to a novel flow control mechanism for ABR (available bit rate service) traffic in ATM (asynchronous transfer mode) networks.

BACKGROUND OF THE INVENTION

ATM is a high speed connection oriented packet switching technique where information is organized into fixed length packets, called cells. In general terms, an ATM network is a collection of end systems interconnected through one or more ATM switches. On a connection, generally, an end-system both sends data to the other end systems on the network involved in the connection, and receives data from other end systems on the network involved in the connection. When an end system is a sender of data, it is referred to as a source; it is referred to as a destination when it is a receiver of data. Typically an end system acts as both source and destination.

The following documents are referred to as prior art;

[1] "ATM Forum Traffic Management Specification, Version 4.0" (Draft), S. S. Sathaye, ATM Forum/95-0013R9, December 1995.

[2] "Enhanced PRCA (Proportional Rate-Control Algorithm)", L. Roberts, ATM Forum/94-0735R1, August 1994.

[3] "NIST ER Switch Mechanism (An Example)," N. Golmie et al., ATM Forum/95-0695, June 1995.

[4] "Intelligent Congestion Control for ABR Service in ATM Networks," K.-Y. Siu and H.-Y. Tzeng, Computer Communication Review, Vol. 24, No. 4, pp. 81–106, October 1995.

[5] "Example Switch Algorithm for Section 5.4 of TM spec," A. Barnhart, ATM Forum/95-0195, February 1995.

[6] "A Sample Switch Algorithm," R. Jain et al, ATM Forum/95-0178R1, February 1995.

[7] "ERICA+: Extensions to the ERICA Switch Algorithm," R. Jain et al, ATM Forum/95-1346, October 1995.

[8] "The Rate-Based Flow Control Framework for the Available Bit Rate ATM Service," F. Bonomi and K. Fendick, IEEE Network, Vol. 9, No. 2, pp. 25–39, March/April 1995.

[9] Applicant's pending application Serial No. 08/634,488 filed on Apr. 18, 1996, "Flow Control of ABR Traffic in ATM Networks", now U.S. Pat. No. 5,754,530 issued on May 19, 1998.

According to [1] above, five service categories, differing in traffic characteristics and/or service guarantees, are defined for ATM networks. They are: (1) CBR (constant bit rate); (2) rt-VBR (real-time variable bit rate); (3) nrt-VBR (non-real-time variable bit rate); (4) UBR (unspecified bit rate); and (5) ABR (available bit rate).

ABR is the most recent among the above service categories. ABR is intended mainly for non-real-time data applications with varying and/or unknown bandwidth requirements and which cannot be easily characterized in terms of a peak cell rate, a sustainable cell rate, and a maximum burst size. Furthermore, it is the only one among the above service categories that is inherently closed loop. Example types of applications for ABR are any UBR application for which the user wants a more reliable service, critical data transfer (e.g. defence information), super computer applications and data communications applications requiring better delay behavior, such as remote procedure call, distributed file service (e.g. NFS), or computer process swap/paging [1].

The source of an ABR VC (virtual connection) periodically creates and sends special control cells called RM (resource management) cells which travel through the same path as data cells of the VC all the way to the destination of that VC. The destination then loops these cells back to the source through the same path. When an RM cell is traveling from the source to the destination, it is referred to as a forward RM cell; when it is traveling from the destination to the source, it is referred to as a backward RM cell. FIG. 1 shows an RM cell with all of its fields. FIG. 2 shows those fields which have bearings on the present invention. As seen in FIG. 2, some of these fields are intended for information-sharing only and are thus read-only fields and others are read/write fields which may be modified by intermediate switches and/or the destination.

The source adjusts its ACR (allowed cell rate) based on the feedback carried by returning RM cells. ACR represents the rate the source is using to control its cell transmission for VC. The value of a particular forward RM cell is inserted in that cell's CCR field at the time of its transmission. It is expected that end systems which comply with the source and destination reference behaviors as recommended by the above-cited ATM Forum Specification [1], will experience a low cell loss ratio and obtain a fair share of the available bandwidth. According to one definition, a fair share for a VC will be a function of its MCR (minimum cell rate) that is negotiated during connection setup, as well as the MCRs of the other VCs sharing with it one or more links.

Five different fairness criteria are described in Section I.3 of [1]. The first criterion (called "Max-Min") only applies to the case where all ABR VCs are unweighted (or equally weighted) and with zero MCRs; both restrictions are unrealistic. The third criterion (called "Maximum of MCR or Max-Min share") does not place any direct restriction on MCRs but it requires long iteration time to converge to the equilibrium point. The fourth criterion (called "Allocation proportional to MCR") can not be used if there are ABR VCs with zero MCRs.

The above leaves only two useful fairness criteria for ABR, namely the second and the fifth. The second criterion (called "MCR plus equal share") requires that each active ABR VC get its contracted MCR plus an equal share of the available elastic bandwidth (the latter is obtained after subtracting the MCRs of all active ABR VCs from the available bandwidth). With the fifth criterion (called "Weighted allocation"), the bandwidth allocation for an ABR VC, say VC[vc_no], is proportional to its predetermined weight, w[vc_no]. The weight of a given ABR VC may or may not be related to its MCR.

In addition to the PTI (payload type identifier) field which distinguishes between RM and data cells, and the VCI/VPI (virtual connection identifier/virtual path identifier) fields which identify the connection of a cell, important fields of an RM cell in the context of this invention are the following (see FIG. 2).

DIR (direction) bit:

When the source creates an RM cell, it sets DIR=0 indicating that this is a forward RM cell. Before the destination loops back an RM cell, it changes DIR to 1 indicating that this is now a backward RM cell. The DIR bit may not be altered by intermediate switches.

CCR (current cell rate) field:

This is a read-only field that contains the value of ACR at the transmission time of this RM cell.

MCR (minimum cell rate) field:

This is a read-only field that contains the contracted MCR. MCR is a minimum guaranteed rate. The source's rate need never be less than MCR.

ER (explicit rate) field:

This is a read/write field. Before the source transmits an RM cell, it should set this field to the desired rate (typically, the peak cell rate of the connection). An intermediate switch along the connection's path may reduce the value of the ER field in RM cells passing through it to whatever value it can support. However, an intermediate switch may never increase the value of the ER field in an RM cell passing through it.

While ATM Forum specification [1] cited above specifies a reference behavior for an ABR end system (e.g. in terms of the generation and handling of RM cells, adjusting ACR, etc.), the ABR switch behavior is largely unspecified and is left as implementation specific. In particular, the method by which a switch monitors its traffic and updates the ER fields of ABR RM cells passing through it is left as implementation specific.

To understand the objectives of an ABR switch mechanism, it is important to first understand the role of ABR within an ATM network (from a network point of view). In general, it is assumed that ABR will have access to the excess bandwidth left unused by "higher" priority traffic classes, namely, VBR and CBR. The handling of CBR bandwidth is straightforward, since CBR consumes a fixed amount of link bandwidth. However, VBR traffic is bursty by definition which causes the amount of bandwidth available to ABR to fluctuate.

Thus, the function of an ABR switch mechanism is to provide each ABR VC with the "right" rate allocation (inserted in the ER field of ABR RM cells passing through it) with the following two (somewhat conflicting) goals in mind: rapid stabilization to high link utilization and small queue sizes at intermediate switches. Furthermore, the bandwidth available to ABR should be shared in a fair manner among contending ABR VCs. What makes the latter objective non-trivial to achieve is the existence of heterogeneous MCRs and weights (i.e. different ABR VCs may have different MCRs and different weights). For example, assume that two ABR VCs, A and B, share a 100 Mbps link where MCR for VC A is 60 Mbps and MCR for VC B is 0 Mbps. Furthermore, assume that the weight of VC A is 1 while that of VC B is 3. Then a straightforward division of the bandwidth would result in VC A getting 50 Mbps, which is even less than its guaranteed minimum of 60 Mbps. However, the fair share for VC A is $60+(100-60)*(1/4)=70$ Mbps and the fair share for VC B is $0+(100-60)*(3/4)=30$ Mbps. This example demonstrates how the only two useful ABR fairness criteria of [1] which are #2 (called "MCR plus equal share") and #5 (called "Weighted allocation") can be combined. In this case, each ABR VC gets its MCR plus a weighted share of the available elastic bandwidth.

It should be noted that this invention intentionally ignores the binary mode of operation for ABR, where switches experiencing congestion set a congestion flag in the headers of data cells and/or set special bits in the RM cells. This is because it is well-known that the explicit rate (ER) mode operation for ABR (where switches know what rates they can support and convey these rates to the ABR sources involved) has far superior performance compared to that of the binary mode [8].

None of these existing ABR switch mechanisms takes into account the MCR values of the contending ABR VCs in their ER calculations (not to mention any possible VC weights). They all make the assumption that all ABR VCs have the same MCR, and thus there is no need to take MCR into account. Clearly, in a real network, different ABR VCs may have different MCRs (and different weights) and as such any good ABR switch algorithm should take MCR (and VC weight) explicitly into account. Furthermore, while modifying some of the existing algorithms to account for MCR may be possible, this is not necessarily true for all of them. In particular, modifying ERICA [6] to account for MCR does not seem to be an easy task.

In addition to the above problem of not taking MCR into account, existing ABR switch mechanisms also suffer from what is known as the "CCR-reliance" problem. This can be explained as follows. All existing ABR switch mechanisms read the CCR fields of RM cells passing through them and use these fields in the calculations of the ERs. An implicit assumption that the existing mechanisms make is that the CCR field read from an RM cell on a given VC represents the actual rate of the VC at the moment of reading the field. This is not true for the following reasons:

First, CCR represents the maximum rate that the VC can use (i.e. ACR) at the time the RM cell was transmitted by the source. However, it is expected that an ABR VC may not use all of its ACR, and thus ACR will be larger than the actual rate of the VC. Therefore, CCR does not necessarily reflect the actual rate of the VC, even just before the RM cell is transmitted (by the source).

Second, when the RM cell is received by an intermediate switch and its CCR field is read by the switch, the CCR field will be too old to even reflect the current value of ACR back at the source, not to mention its current actual rate.

Third, a bad (but perhaps smart) source may insert the wrong ACR value in its CCR field, hoping to acquire more rate by doing so. If this happens with any of the known ABR switch mechanisms, the network may suffer (in terms of buffer overflows, etc.) and major fairness problems may arise.

To avoid the CCR-reliance problems, per ABR VC rate measurements have to be performed. However, this has been avoided in existing ABR switch mechanisms because it was thought that this (i.e. measuring rates per ABR VC) is too complex to implement and may require scanning of ABR VCs to update their measured arrival rates.

EPRCA [2] was the first ER switch mechanism to be proposed. In EPRCA, two congestion states are defined: congested when the queue size exceeds some threshold, and very congested when the queue size exceeds a larger threshold. EPRCA maintains a running weighted exponential average, called MACR, of the CCR fields of all ABR VCs ($MACR=MACR*15/16+CCR*1/16$). This is done by first intercepting any forward RM cell passing through the link under consideration and reading its CCR field. The newly read CCR is allowed to trigger an update to the MACR average only if the link is congested (as defined above) and CCR<MACR, or if the link is not congested (as defined above) and CCR>MACR*7/8. When a backward RM cell is received and the link is very congested, then ER=min(ER in cell, MACR*1/4). Otherwise, if the link is just congested and CCR>MACR*7/8, then ER=min(ER in cell, MACR*15/16).

It has been shown by many ATM Forum contributions that EPRCA suffers from the following problems: oscillations, link under-utilization, unfairness, and parameter sensitivity. These problems are in part due to the way EPRCA defines congestion (i.e. queue threshold crossing). The problems are expected to become even worse with the introduction of VBR into the network, since EPRCA takes VBR traffic into account indirectly through the queue length measurements.

ERICA[6] and [7], uses a different approach in coming up with the right ER for each ABR VC, and operates with a target link rate in mind. ERICA uses a count based measurement interval: for every N cells received (it is unclear whether this count includes ABR cells only, or all cells), the following link variables are updated:

Nactive = the number of ABR VCs seen in this interval
VBR_Input_Rate = number of VBR cells received/interval duration
ABR_Capacity = target rate-VBR_Input_Rate
Load_Factor = ABR_Input_Rate/ABR_Capacity
Fair_Share = ABR_Capacity/Nactive Also, the flag Connection_Seen is reset for all ABR VCs (this requires scanning for all ABR VC at the end of each measurement interval). The CCR fields are read from forward RM cells and stored, and are then used to update the ER fields of backward RM cells according to the following equations.

ERS = max(Fair_Share, CCR/Load_Factor)
ER = min(ER in cell, ERS)

Furthermore, multiple backward RM cells on the same ABR VCs which are seen during the same measurement interval are given the same ER value; this is done in order to avoid oscillations. This adds two more variables per ABR VC: a flag to indicate that a backward RM cell has been seen on the VC in this measurement interval, and the rate that was last given to each ABR VC. The flag (together with the above-mentioned Connection_Seen flag) must be reset for all ABR VCs at the end of each measurement interval.

No independent evaluation of ERICA has been published. However, the present inventors have conducted extensive simulation studies of ERICA under various network scenarios and found that ERICA (at least in its published form) suffers from several serious problems. They include:

Scalability:

Ignoring VBR traffic for now, ERICA is extremely sensitive to the choice of the measurement interval length. If the recommended 30-cell length (for OC-3 links) is used, that means that a maximum of only 30 ABR VCs can be declared as active in any given measurement interval. This would cause the first term in ERICA's main equation (i.e., Fair_Share=ABR_Capacity/Nactive) to be excessively large, causing problems for the switch since this Fair_Share will be provided to all non idle ABR VCs whether they have contributed to Nactive or not. On the other hand, if the length of the measurement interval is chosen to be large enough (say, 10 times the number of VCs which are set up to pass through the link under consideration), then so much activity may be lost and ERICA would be too slow to react to both congestion and under-utilization problems. If the length of the measurement interval is chosen somewhere in between, severe oscillation would occur. Another aspect of scalability concerns the requirement in ERICA to scan all ABR VCs at the end of each measurement interval in order to reset two per VC flags.

Fairness:

It can be shown that, even with MCR=0 (and equal weights) for all ABR VCs, ERICA may not necessarily achieve the max-min fairness criterion in certain network scenarios. For example, it is assumed that the measurement interval length is chosen in such a way that the above-mentioned problems are avoided (it is not certain that this is possible). It is further assumed that a large number of ABR VCs exist on a link where all of them (except, say, for one VC) are rate limited. In this case, the ACRs of the rate limited VCs will be determined through the first term in ERICA's main equation (i.e. Fair_Share=ABR_Capacity/Nactive). On the other hand, the ACR of the only greedy VC will be determined through the second term in ERICA's main equation (i.e. CCR/Load_Factor). Now, if one of the initially rate limited VCs decides that it wants to become greedy and uses all of the bandwidth that it is given, it may not be able to share the link fairly with the VC that initially started as greedy. This happens because the network locks into the wrong set of rate allocations.

On a given ABR VC, the source sends data cells to the destination through one or more intermediate ATM switches. Furthermore, in accordance with the ATM Traffic Management Specification [1] referred to above, the source periodically creates and sends forward RM cells. The aggregate traffic sent by the source is dynamically shaped to ACR (allowed cell rate), which is controlled by the network. The forward RM cells travel through the same path as that of the data cells on the same VC. These forward RM cells are characterized by having their DIR bit set to 0 (see FIG. 2) and carry information about the source that can be useful to the network. In particular, the source inserts its current ACR in the CCR (current cell rate) field of the forward RM cell. Also, it inserts its contracted MCR (minimum cell rate) in the MCR field. Furthermore, it indicates its desired rate through the ER (explicit rate) field; typically, the ER field will be initially set to PCR (peak cell rate) of the connection.

When the destination receives a forward RM cell, it changes the DIR bit to 1 indicating that the cell is now a backward RM cell, reduces the ER field to whatever value it can support, and finally loops the RM cell back to the source. The backward RM cells travel through the same path as that of the data and forward RM cells on the same VC, but in the reverse direction.

In accordance with the ATM Forum Traffic Management Specification [1], intermediate switches have the option of intercepting forward and/or backward RM cells to reduce their ER fields to whatever values they can support as long as fairness is maintained. Thus, when an RM cell finally returns to its originating source, its ER field would reflect the maximum possible rate on the most congested link along the connection's path. The source then adjusts its ACR using:

ACRnew = min(ER in returning RM cell, ACRcurrent + RIF*PCR)

where RIF (rate increase factor) is a parameter that is determined during connection set-up. The source always ensures that the resulting ACR is never below MCR or above PCR. It can be seen that when RIF=1, ACR is totally controlled by the ER values in returning RM cells.

In [9] above, a schematic diagram of ABR flow control algorithm as applied to a single output-buffered ATM switch is described in detail. FIG. 3 is a schematic illustration of a single output-buffered ATM switch where an embodiment of the invention is implemented. It should be noted that the invention itself applies to any ATM switch architecture and is not restricted to output-buffered switches only. The invention typically resides at each queuing point of an ATM switch. Referring to FIG. 3, a switch fabric 40 connects a pair of ports 42, each having a queue 44 at its egress. The data cell flow and RM cell flows associated with one direction of an ABR VC are shown in differing solid lines with an arrow.

In summary, the flow control comprises four processes, namely, a traffic monitoring process, a measurement interval process, a forward RM cell process, and backward RM cell process.

The traffic monitoring process is concerned with monitoring the traffic (ABR and otherwise) being received and dequeued, and updating various cell counts. These cell counts are used by other processes.

In the measurement interval process, the output rate available to ABR is determined and a load factor is updated. This involves steps to determine the ABR input rate, the ABR output rate, and the input and/or output rates of other traffic classes. One aspect of this flow control is that it takes into account riot only ABR input rate, but also ABR output rate. This indirectly takes into consideration the ABR cells already in the queue, especially in situations where ABR cells accumulate in the queue because of, e.g., VBR traffic. Another aspect of the flow control is that, when determining the rate available to ABR, it takes into account both the input and output rates of VBR as well as previous samples of the rate available to ABR.

In the forward RM cell process, forward RM cells are intercepted and their CCR fields are read. The read CCRs are used to update certain link and VC variables. In particular, a moving average of the CCRs seen on each VC is maintained. Furthermore, a moving average of the CCRs seen on all VCs (but without their MCR components) is also maintained; this link variable is called the mean elastic rate. Also, a moving average of the weights of all seen ABR VCs is maintained. Thus, one aspect of the flow control is the averaging of the CCRs seen on a VC. By doing so, certain oscillation problems are avoided without resorting to approaches which require scanning of all ABR VCs at the end of each measurement interval. Another aspect of the flow control is the subtraction of MCR from CCR before triggering an update to the link-wide average of CCRs (i.e. the mean elastic rate). This achieves an MCR-based fairness. A third aspect is the averaging of the weights of seen ABR VCs.

In the backward RM cell process, backward RM cells are intercepted to update their ER fields. One aspect of the flow control is its main equation of calculating the ER for a VC. That equation utilizes the VC's MCR, the VC's weight, the moving average of CCRs seen on this VC, the link's mean elastic rate, and the link's load factor. Another aspect of the flow control is the differentiation between two link states when calculating the ER for a given VC: excessively overloaded (when the load factor is less than some threshold), and otherwise. This differentiation is found to be extremely important to prevent the network from being locked into the wrong set of rate allocations and to allow newly active ABR VCs to acquire their fair share of the bandwidth. Through yet another aspect of the flow control, the rate allocation may be further adjusted based on how much total rate (on all ABR VCs) is allowed as compared to the output rate actually available to ABR; this is controlled through a maximum overbooking factor.

As seen in the above description, this earlier flow control mechanism described in the applicant's U.S. Pat. No. 5,734,530 measures and utilizes rates, both aggregate and per-connection. In summary, according to the described flow control mechanism, the main equation for updating the ER field for ABR connection [vc_no] is:

$$ERS = \max[T1, T2]$$

where $T1 = MCR[vc\_no] + MER^*UF$, and
$T2 = IR[vc\_no]^*UF$.

MER is a running exponential weighted moving average of the elastic rates (elastic rate=non-guaranteed rate=actual input rate-MCR) seen on all connections. It is updated with every forward RM cell received. IR[vc_no] is the actual input rate measured on the virtual connection VC[vc_no]. UF is an underload factor for the link. It is also mentioned that MER does not represent the "real" average of the rates of "active" connections. Rather, it is biased towards larger connections and this bias is believed to improve fairness and helps preventing the network from being locked into the wrong set of rate allocations, which may result in connections which may initially be rate-limited, being not able to acquire their fair share of the bandwidth when they become more active.

OBJECTS OF THE INVENTION

It is therefore an object of the invention to provide a method of controlling the flow of ABR traffic in an ATM network.

It is also an object of the invention to provide a method of controlling the flow of ABR traffic in an ATM network by ER value for each VC.

It is another object of the invention to provide a method of calculating an ER value for each VC.

It is a further object of the invention to provide a method of calculating an ER value which realizes a high link utilization.

It is still a further object of the invention to provide a method of calculating an ER value which realizes a small queue size requirement at an ATM switch.

It is yet another object of the invention to provide a method of calculating an ER value which realizes a fair share of bandwidth among virtual connections.

It is yet a further object of the invention to provide a method of controlling the flow of ABR traffic in an ATM network in which each switch regulates independently of other switches, the amount of ABR traffic it receives with the following objectives in mind: achieving a given target link utilization quickly, keeping the queue sizes small, and achieving fairness among ABR VCs.

SUMMARY OF THE INVENTION

Briefly stated, the invention resides in an ATM network consisting of one or more ATM switches and carrying ABR traffic including ABR resource management cells called RM cells. In accordance with one aspect, the invention is directed to a method of controlling the ABR traffic flow by means of RM cells in which the step of receiving and processing a backward RM cell includes the steps of determining a maximum elastic rate, MEIR, for the link under consideration.

According to another aspect in which the RM cells contains ER, explicit rate, field and CCR, current cell rate, field, the invention is directed to a method of controlling the ABR traffic flow on a given link of an ATM switch by means of the RM cells for a virtual connection, VC. The method comprises steps of receiving and processing forward RM cells for the VC, receiving and processing backward RM cells for the VC and updating parameters either everytime a backward RM cell for the VC is received or when a predetermined number of ABR cells for the VC are received. The method includes further steps of generating an explicit rate allocation to be placed in the ER field in a backward RM cell for the VC by using the updated parameters; and sending the backward RM cell for the VC containing the allocated rate in the ER field.

BRIEF DESCRIPTION OF THE DRAWINGS

FIG. 1 shows an ABR RM cell format;

FIG. 2 shows characteristics of a few fields of an ABR RM cell which are relevant to the invention;

FIG. 3 is a schematic illustration of an embodiment of the invention applied to an output buffered ATM switch;

FIG. 4 is a sketch illustrating a problem which may be encountered in the known flow control mechanism;

DETAILED DESCRIPTION OF THE PREFERRED EMBODIMENTS OF THE INVENTION

By referring to FIG. 4, the following scenario illustrates some problems of the earlier flow control mechanism. Six connections are shown: A through F. For each connection, its actual measured input rate (i.e., IR[vc_no]) and its allowed rate (i.e., ACR[vc_no]) are shown. Connections A and B have actual rates which are greater than the "mean" MER. This results in their ACRs being equal to their actual rates since T2 in the above equation is greater than T1. For connection C, the IR[C]=MER=ACR[C] (and T1=T2). For Connections D through F, the actual rates are smaller than MER, and therefore the ACRs are all equal to MER (since T1>T2).

Figure 5:
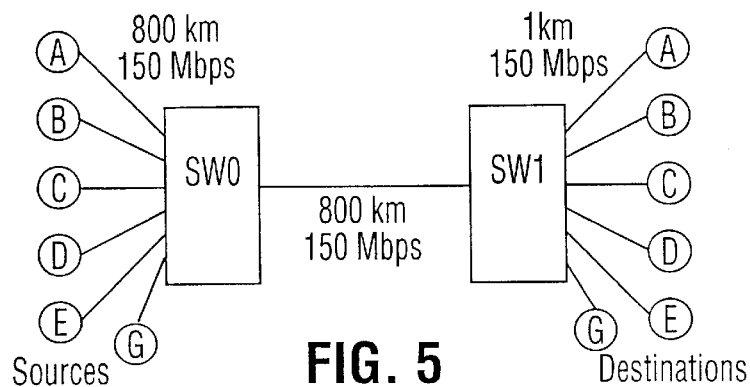
FIG. 5 is a schematic illustration of a simulation set-up which was used to investigate the problem and evaluate the invention.

Ideally, should connection B become non-rate-limited, it should end up with the same allowed rate as that of connection A. However, it can be seen that this would not happen. This is because B is already using all of its ACR and does not have any "headroom" to grow and disturb the balance of the link. (The same applies to connection C.) The above problem may happen even if the actual rate of the source is less than MER but very close to it (e.g., connection D). To examine the validity of these arguments above, the following simulation experiment was conducted. As shown in FIG. 5, the following Two-Node model was used with seven connections. Two switches SW0 and SW1 are interconnected through a 150 Mbps link of 800 km in length. Seven source end system, A–G, are connected to SW0, each by a 150 Mbps link of 800 km in length. Seven desination end system, A–G, corresponding to the above seven sources, are connected to SW1, each by a 150 Mbps link of 1 kim in length. All connections start at t=0. Sources are as follows:

A:greedy.

B:rate-limited to 25 Mbps till t=0.125 msec when it becomes greedy.

Figure 6:
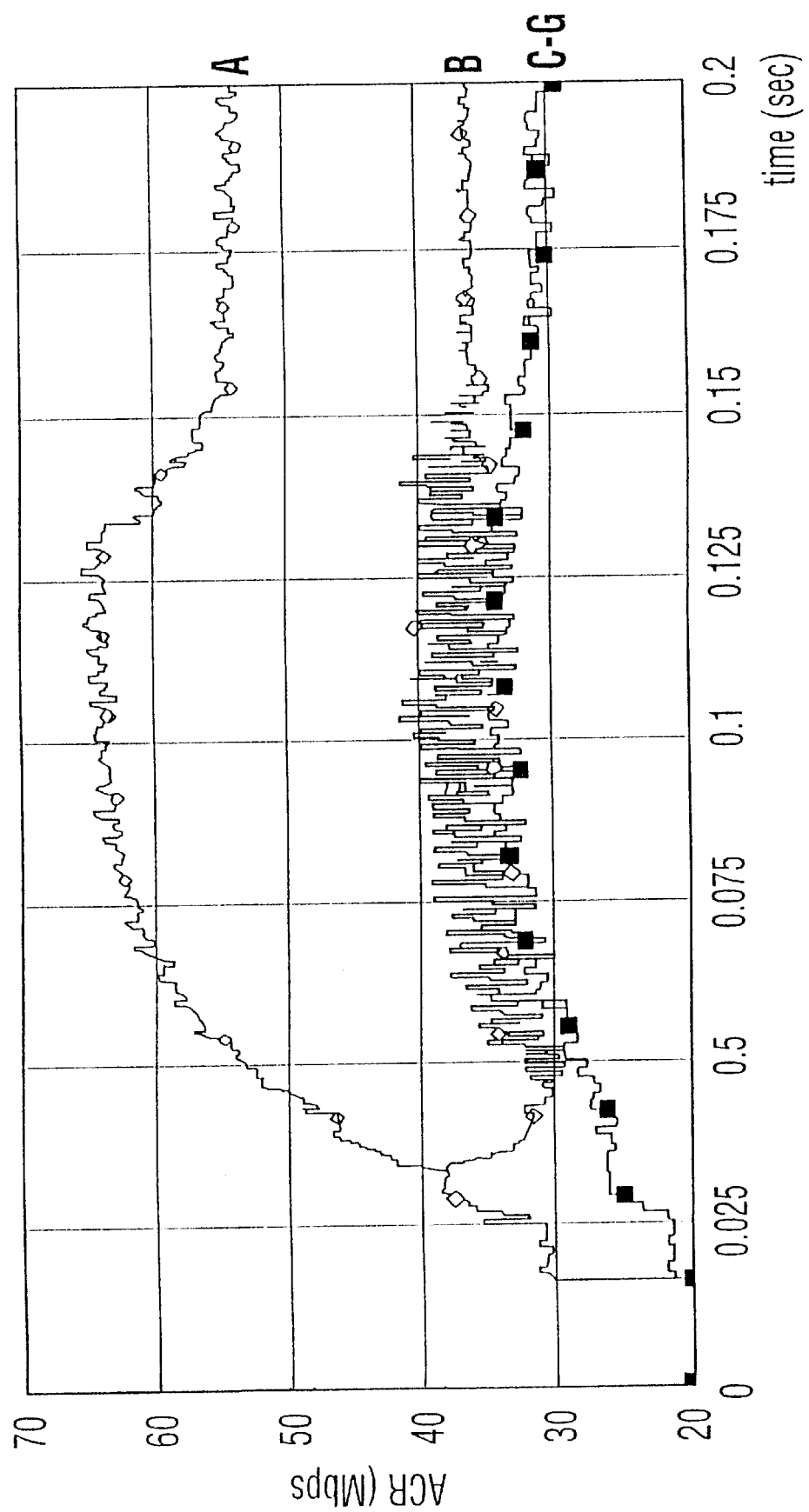
FIG. 6 is the results of the simulation shown in FIG. 5.

C–G:rate limited to 10 Mbps. Ideally, when B becomes greedy at t=0.125 msec, it should be able to acquire (TU*150-5*10)/2=46.25 Mbps when the target utilization TU is 95%. As seen in FIG. 6, connection B, however, is unsuccessful against connection A and cannot acquire the 46.25 Mbps fair share.

As has been mentioned earlier, the fact that MER is biased towards higher rates (or equivalently, larger connections) was found to be useful from a fairness point view, since this will allow some headroom for connections with rates less than MER which would enable them to acquire their fair share should they decide to become more active.

The problem that was discussed in the previous section is because the bias was not large enough.

According to one embodiment of the present invention, the algorithm allows a connection (if active enough) to acquire as much rate as the one with the current highest rate.

Basic Algorithm

In the following, the "MCR+weighted fair share" fairness criterion is assumed but modifying the algorithm to support the "max {MCR, weighted fair share}" fairness criterion is straightforward. The new algorithm includes the following main components.

The input rates are measured on a per-ABR-connection basis:

$$IR[vc\_no]$$

Elastic input rates easily follow by removing the guaranteed part:

$$EIR[vc\_no] = IR[vc\_no] - MCR[vc\_no]$$

A negative EIR[vc_no] means that the connection is operating within its guaranteed minimum rate. Note that EIR[vc_no]+MCR[vc_no] represents the actual rate of connection VC [vc_no].

The MEIR, maximum elastic input rate (per unit weight) over all "active" connections on the link is memorized:

$$MEIR = \max\{EIR[vc\_no] / w[vc\_no]\}$$

Any connection that is active enough can grow its elastic rate up to MEIR*w[vc_no], where w[vc_no] is a preset weight for the virtual connection VC[vc_no].

Given the output rate available to ABR (for a given target link utilization) and the actual ABR input rate, an underload factor is updated periodically:

UF=rate available to ABR/actual ABR input rate

When a backward RM cell arrives, an initial explicit rate is calculated as follows:

$$ERS = MCR[vc\_no] +$$
$$\{EIR[vc\_no] + (MEIR^*w[vc\_no] - EIR[vc\_no])/K\}UF$$

where K is a factor that controls the "aggressiveness" of the algorithm.

K=1 is the most aggressive, where a connection is allowed in addition to its MCR, an elastic rate that is equal to the largest current actual elastic rate on the link (after taking weights into account), regardless of the connection's actual elastic rate.

When K>1, a connection can grow its elastic rate gradually: the more active it becomes, the more elastic rate it gets. It is interesting to observe that while a connection's elastic rate grows towards the target elastic rate (which is MEIR*w[vc_no]), the target itself decreases towards the connection's elastic rate to maintain a given target utilization level of the link.

Figure 7:
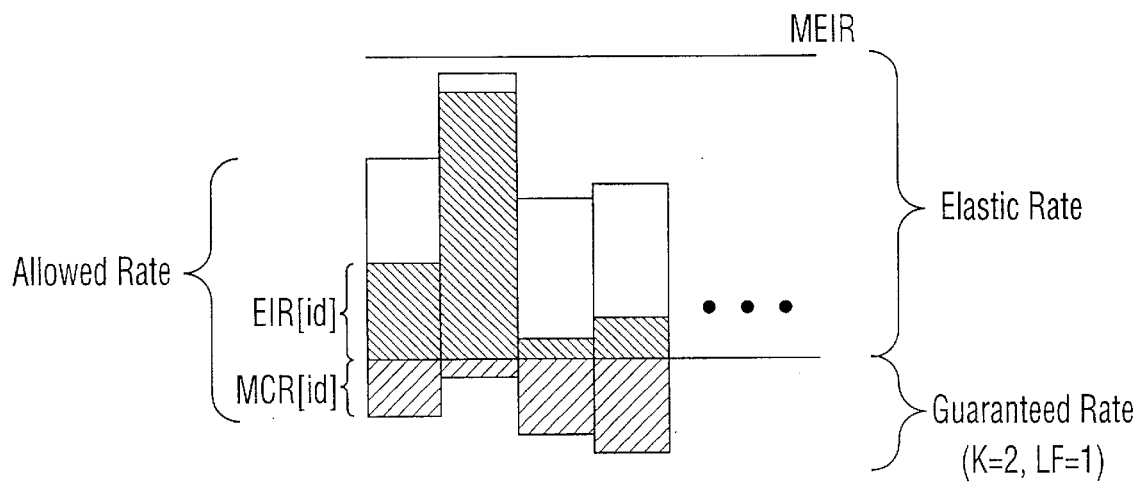
FIG. 7 is a graph showing the relationships of various parameters.

FIG. 7 illustrates the effects of this algorithm for the case of K=2 and UF=1. It shows headrooms for each connection.

According to further embodiments, certain more refinements can be made to the above basic algorithm, to make the algorithm more adaptable to various and wider circumstances.

Non-Positive MEIR:

There is a special case in which the above equation can not handle. For example, assume that there is one connection on the link and that it is operating within its MCR. From the above equation, it can be seen that this connection will not be able to grow its rate beyond its MCR when it becomes more active. In general, the above problem occurs only when MEIR is non-positive. A non-positive MEIR means that all connections are operating at rates less than their MCRs. Even if this is initially the case, the term $$\{EIR[vc\_no] + (MEIR^*w[vc\_no] - EIR[vc\_no])/K\}UF$$

can never become positive since all connections will only get their MCRs as allowed rates and nothing more and thus their EIRs (and consequently MEIR) are at most zeros.

The problem does not occur when MEIR is positive, because a connection that is initially operating within its MCR will have at least its MCR as an allowed rate. When it becomes more active and uses its full MCR, its EIR becomes zero, the above term becomes positive and the connection will be able to grow its rate.

According to one embodiment, when MEIR is non-positive, the following equation is used.

$$ERS = (MCR[vc\_no] + EIR[vc\_no])^*UF$$

This should allow a connection to acquire more rate than its MCR, if it is active enough. In this case when all connections are operating within their MCRs, it is possible to achieve the target link utilization simply by scaling every connection's actual rate by the underload factor. Note that a connection may first have to use a certain portion of its MCR before it is allowed more rate.

Dynamic K:

As mentioned earlier, K is a factor that controls the aggressiveness of the algorithm. In other words, it controls how much "headroom" a connection may be given above its current rate. A small K generally results in a more aggressive operation, faster convergence, and potentially larger queues (and possibly cell losses). On the other hand, a large K generally results in a less aggressive operation and smaller queues at the expense of slower convergence to the fair shares. Given an MEIR, it may not be desirable that all connections whether small (with elastic rates much less than MEIR) or big (with elastic rates close to MEIR) use the same K since this would make the choice of a single K difficult.

One can vary K, subject to a minimum $K_{min}$ and a maximum $K_{max}$, based on how much elastic rate the connection is using compared to how far it is from MEIR. Another embodiment uses a simple way to do this as follows:

$$K = \min\{(MEIR^*w[vc\_no] - EIR[vc\_no])/EIR[vc\_no], K_{max}\}$$
$$K = \max\{K, K_{min}\}$$

The above division is not required to be accurate. Also, to simplify the division by K, K may be chosen as the next smallest power of 2. Varying K dynamically results in both fast convergence and reasonable queue sizes. Initially, a small connection will not be given too much headroom that may cause serious problems at the switch. This is achieved through larger values of K. As the connection moves towards the target rate, smaller values of K ensure fast convergence.

MEIR:

MEIR represents the maximum (target) elastic input rate (per unit weight) for all connections. It seems logical to prevent an EIR that is causing a problem (e.g., link overload and/or queue growth) from contributing to MEIR. Similarly, when there is a problem, it seems logical to prevent MEIR from increasing. If the congestion is severe, then it may be desirable to slowly reduce MEIR without waiting for the underload factor to force it down after a feedback delay. However, this should be done carefully so as not to introduce unnecessary oscillations. In the absence of ABR traffic, MEIR should decay over time.

Underload Factor UF:

The underload factor is obtained as follows:

UF=actual rate available to ABR/actual ABR input rate Ideally, both term involved should not include the MCRs. For example, when an output opportunity is used towards satisfying the MCR of a connection, it should not be accounted for in the "rate available to ABR". Similarly, when an ABR cell arrives on a connection that is operating within its MCR, its arrival should not be accounted for in the "actual ABR input rate".

Unfortunately, the above may not be easy to do. In particular, this is true with regard to removing the MCRs from the actual ABR input rate. Not doing son is expected to slow the responsiveness of the algorithm when connections with large MCRs exist on the link.

Target Utilization:

There are two different approaches with regard to the target utilization TU (which affects the computation of the underload factor UF).

The first approach has been used in the description above in connection with the above referenced copending patent application where ABR targets are the smallest of:

rate left unused by higher priority traffic, and TU*link speed.

In the second approach, which is chosen in this embodiment, ABR target are chosen as:

TU*rate left unused by higher priority traffic.

Smoothing ER

It is important to avoid oscillations in the system as much as possible, since oscillations may lead to buffer overflows and/or link under-utilization. Also, oscillations are bad to the users of the ABR service. The algorithm of the invention is measurement-based and measurements usually include errors. Through measurements, the underload factor UF, the maximum elastic input rate MEIR, and the elastic input rate on a connection EIR[vc_no] are obtained. Each of these measurements uses its own time scales and averaging weights. As a result, mismatches may and do occur, causing oscillations in the rate given to a connection. According to yet a further embodiment, oscillations are reduced by smoothing the ER given to a connection. This is done as follows: the last ER given to each connection is stored: Last_ER[vc_no]. When a backward RM cell arrives, an initial explicit rate ERS is calculated as before. Then:

$$ERS = \alpha_{ER}{}^{*}ERS + (1 - \alpha_{ER}){}^{*}Last\_ER[vc\_no].$$

This greatly reduces any unnecessary oscillations while moving towards the "right" ER. It is important to note that $\alpha_{ER}$ should be small (e.g., 0.25–0.5) so as not to jeopardize responsiveness. Smoothing ER will, in general, improve the overall performance, especially with VBR traffic. It is important to note that the above approach is new and different from the approach adopted in ERICA mentioned above, where a connection is given the same rate in each measurement interval. In the present approach, a connection moves towards the right ER with every backward RM cell processed.

In the results of simulation, the effect of ER smoothing will be shown for almost all scenario considered.

Per-ABR-VC Rate Measurements

As has been discussed earlier, all existing ABR ER switch mechanisms suffer (among other problems) from the CCR-reliance problem. While the methods described so far solve many problems of existing ABR switch mechanisms (e.g., fairness, scalability, etc.), it nevertheless suffers from the same CCR-reliance problem. This problem arises, e.g., when a bad user lies about his CCR. While this may not constitute a serious problem for private networks, the situation is totally different when public networks are involved. In a public network, a bad user should never be allowed to affect the service being provided to other users.

In the above referenced applicant's copending application, the above, rates are measured per ABR VC. This is done in a simple event-driven approach where the rate measurement updates on a given ABR VC are triggered with the arrival of its own RM cells. Now that the rates are measured per ABR VC, it is possible to know exactly the actual rate of each ABR VC and also to distinguish between "lazy" ABR VCs and non-lazy ones. The above can be utilized in the ER calculations in a variety of ways. The per-connection rates are updated with every forward RM cell received. However, in the present invention, the rate measurements are updated when backward RM cells are received instead of forward RM cells. This handles situations when the source suddenly goes idle and the destination generates its own backward RM cells. If per-connection rate measurement updates are triggered only with the arrival of cells in the forward direction, then the ERs provided to these destination-generated backward RM cells will not take into account that the source has gone idle.

The rate measurements on a given connection are also updated in the invention when a pre-specified number of cells, $N_{max}$, have been received since the last rate measurement update on the same connection.

Queue Length Measurements

Figure 8:
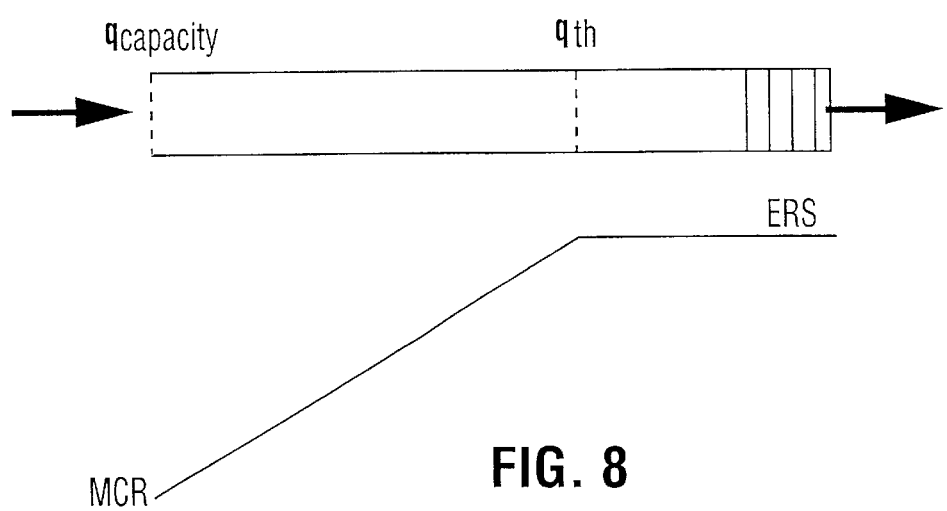
FIG. 8 shows graphically the effect of the queue length measurement.

The present algorithm is rate-based: it measures and utilizes rates to determine the rate allocated to each connection. This is done without considering the queue sizes of the individual connections or the ABR class. There may be situations where the basic algorithm fails to prevent excessive queue build-ups. This may happen, for example, if the algorithm is operating at near 100% target utilization, and extremely bursty VBR traffic shares the link with ABR. According to a further embodiment, queue lengths are measured for emergency situations where the basic ER algorithm fails in preventing excessive queue build-ups (and thus potential cell loss). At he connection level, one can do the following. If the queue size $q_{size}[vc\_no]$ exceeds a predetermined threshold $q_{th}$, the rate just calculated for the connection ERS is reduced gradually all the way to MCR, such that the connection gets only its MCR when $q_{size}[vc\_no]$ crosses another predetermined parameter $q_{capacity}$. ($q_{capacity}$ may be set slightly larger than the connection's maximum buffer capacity to avoid giving zero rate to connections with zero MCR). The above procedure translates to:

if $(q_{size}[vc\_no] > q_{th})$ $ERS =$ $ERS - (ERS - MCR[vc\_no])^{*}(q_{size}[vc\_no] - q_{th})/(q_{capacity} - q_{th})$ FIG. 8 shows this action graphically.

Similar to the above, if the total number of queued ABR cells $Q_{size}$ exceeds a predetermined threshold $Q_{th}$, then it may be desirable to use a reduced target link utilization TU. When $Q_{size}$ crosses $Q_{capacity}$, the target utilization is set to $TU_{min}$.

if $(Q_{size} > Q_{th})$ $TU_{current} = TU - (TU - TU_{min})^{*}(Q_{size} - Q_{th})/(Q_{capacity} - Q_{th})$ else $TU_{current} = TU$ $Q_{th}$ and $q_{th}$ should not be set too small in order to avoid unnecessary interference with the basic rate-based algorithm. If it is desired to disable the queue part, the above thresholds may be set to very large values.

Detailed Description of the Algorithm

The following description assumes "MCR+weighted fair share" fairness criterion, and also a certain way to deal with VBR (while CBR and possibly reserved UBR will have priority over ABR, they are not included in this description because they are not relevant to the present invention. It should be noted that adding such traffic is straightforward to those skilled in the art.

Per-Link Parameters

| | |
|---|---|
| T | length of measurement interval in seconds |
| TU | target utilization; determines how much rate ABR can target out of all the rate available to it; may be reduced it there is excessive queue build-up |
| $TU_{min}$ | TU may not be reduced below this minimum target utilization |
| $\delta_{UF}$ | when the underload factor UF is less than $1-\delta_{UF}$, the link is considered to be severely congested |
| $K_{min}$ | the lower limit on K which controls the aggressiveness of the algorithm with respect to rates given away to connections; K=1 is the most aggressive |
| $K_{max}$ | the upper limit on K |
| $\alpha_{MEIR}$ | weight used in smoothing MEIR under normal conditions (no severe congestion); only samples greater than MEIR are used; the new sample carries a weight of $\alpha_{MEIR}$ while the current MEIR has a weight of $1-\alpha_{MEIR}$ |
| $\beta_{MEIR}$ | same as for $\alpha_{MEIR}$ except that it is used when the link is severely congested (i.e., the underload factor is less than $1-\delta_{UF}$); in this case all samples are used |
| $N_{max}$ | maximum number of cells received on a given ABR connection before updating EIR[vc_no] and possibly MEIR |
| MEIR_RF | reduction factor; used to reduce MEIR every measurement interval in the absence of ABR traffic |
| $\alpha_{EIR}$ | weight used in smoothing EIR[vc_no], the elastic rate on connection VC[vc_no]; the sample just measured carries a weight of $\alpha_{EIR}$ while the current EIR[vc_no] has a weight of $1-\alpha_{EIR}$ |
| $\alpha_{ER}$ | weight used in smoothing the rate given to connection VC[vc_no]; the rate just calculated carries a weight of $\alpha_{ER}$ while Last_ER[vc_no] has a weight of $1-\alpha_{ER}$ |
| $\alpha_{VBR}$ | weight used in smoothing VBR_Rate |
| $q_{th}$ | per-connection queue threshold (cells) |
| $q_{capacity}$ | per-connection queue capacity (cells) |
| $Q_{th}$ | ABR class queue threshold (cells) |
| $Q_{capacity}$ | ABR class queue capacity (cells) |

Per-VC Parameters

| | |
|---|---|
| MCR[vc_no] | contracted MCR of this connection |
| w[vc_no] | weight assigned to this connection |

Per-VC Variables

| | |
|---|---|
| Tfwd[vc_no] | time last input rate update was performed for this connection |
| Nfwd[vc_no] | number of cells received on this connection since its last input rate update |
| EIR[vc_no] | running exponential weighted average of the actual elastic rate seen on this connection; uses $\alpha_{EIR}$ |
| Last_ER[vc_no] | running exponential weighted average of the ERS computed for this connection; uses $\alpha_{ER}$ |
| $q_{size}$[vc_no] | current queue size of this connection (cells) |

Per-Link Variables

| | |
|---|---|
| UF | underload factor; the ratio of the rate available to ABR to the aggregate ABR rate; when UF<$-\delta_{UF}$ the link is considered to be severely congested |
| MEIR | maximum elastic rate; smoothed using either $\alpha_{MEIR}$ or $\beta_{MEIR}$ depending on the congestion status |
| MEIRS | a snapshot of MEIR taken every measurement interval; MEIRS*w[vc_no] is the target elastic rate for connection VC[vc_no] |
| No_ABR_Traffic | a flag to indicate whether any ABR input rate updates have been performed during the current measurement interval; at the end of each measurement interval, the absence of ABR traffic forces MEIR to be reduced by using MEIR_RF |
| Rate_Available_To_ABR | amount of link bandwidth available to ABR traffic as of the most recent measurement interval |
| ABR_In_Count | number of ABR cells received since the end of the last measurement interval (incremented with every enqueued ABR cell) |
| ABR_Out_Count | number of ABR cells sent since the end of the last measurement interval (incremented with every dequeued ABR cell) |
| VBR_Out_Count | number of VBR cells sent since the end of the last measurement interval (incremented with every dequeued VBR cell) |
| VBR_Rate | smoothed VBR rate; updated every T sec; uses $\alpha_{VBR}$ |
| $Q_{size}$ | current number of queued ABR cells |
| $TU_{current}$ | current, possibly reduced, target link utilization |

Traffic Monitoring Process

```
when a cell is enqueued on connection VC[vc_no]:
    it (ABR cell)
        ABR_In_Count=ABR_In_Count+1
        Nfwd[vc_no]=Nfwd[vc_no]+1
        if (Nfwd[vc_no]>N_max)
            Update Input Rates Process
when a cell is dequeued (onto the link):
    if (ABR cell)
        ABR_Out_Count=ABR_Out_Count+1
    it (VBR cell)
```

-continued

```
            VBR_Out_Count=VBR_Out_Count+1
when a cell is received from the link:
    if (Backward RM ABR cell)
        Update Input Rates Process
        BackwardRM Cell Process
Update Input Rates Process No_ABR_Traffic=0
Actual_Elastic_Rate=Nfwd[vc_no]/(now-Tfwd[vc_no])-MCR[vc_no]
Nfwd[vc_no]=0
Tfwd[vc_no]=now
EIR[vc_no]=α_EIR*Actual_Elastic_Rate+(1-α_EIR)*EIR[vc_no]
if (EIR[vc_no]/w[vc_no]>MEIR && UF>1.0):
    MEIR=α_MEIR*EIR[vc_no]/w[vc_no]+(1-α_MEIR)*MEIR
else if (UF<1.0-δ_UF):
    MEIR=β_MEIR*EIR[vc_no]/w[vc_no]+(1-β_MEIR)*MEIR
Measurement Interval Process every T seconds:
ABR_Rate=ABR_In_Count/T
    Meaured_VBR_Rate=VBR_Out_Count/T
    VBR_Rate=α_VBR*Measured_VBR_Rate+(1-α_VBR)*VBR_Rate
if (Q_size>Q_th):
    TU_current=TU-(TU-TU_min)*(Q_size-Q_th)/(Q_capacity-Q_th)
else
    TU_current=TU
Rate_Available_To_ABR=max{0, Link Speed-VBR_Rate}*TU_current
UF=Rate_Available_To_ABR/ABR_Rate
if (NO_ABR_Traffic=1):
    MEIR=MEIR*MEIR_RF
MEIRS=MEIR
No_ABR_Traffic=1
ABR_In_Count=ABR_Out_Count=VBR_Out_Count=0
Backward RM Cell Process if (MEIRS>0.0)
    Target=min{MEIRS*w[vc_no], Rate_Available_To_ABR}
    Res=Target-EIR[vc_no]
    K=min{K_max, max {K_min, Res/EIR[vc_no]}}
    ERS=min{EIR[vc_no]+Res/K, Target}*UF+MCR[vc_no]
else
    ERS=(MCR[vc_no]+EIR[vc_no])*UF
    ERS=max(ERS, MCR[vc_no])
if (q_size[vc_no]>q_th):
    ERS=ERS-(ERS-MCR[vc_no])*(q_size[vc_no]-q_th)/(q_capacity-q_th)
ERS=min {ERS, Rate_Available_To_ABR}
ERS=α_BR*ERS+(1-α_BR)*Last_ER[vc_no]
Last_ER[vc_no]=ERS
ERS=min{ERS, Cell_ER}
Replace the ER field with ERS
Release the cell to the fabric
```

Simulation Results

Here, some simulation results are presented. The purpose of this section is not to provide a full analysis of the invention, but rather to demonstrate the importance of key features of the present invention.

Referring back to FIG. 5, the same simulation network model is used to evaluate the present invention. It is assumed that each source-destination pair has only one ABR VC. It can be seen that the seven VCs share the only inter-switch link.

Unless otherwise specified, the following settings for the algorithm described above are used:

| TU: 0.95 | Kmax: 16 | MEIR_RF: 0.95 |
|---|---|---|
| T: 1 ms | $\alpha_{MEIR}$: ½ | $\alpha_{EIR}$: ½ |
| $\delta_{UF}$: 0.05 | $\beta_{MEIR}$: 1/32 | $\alpha_{ER}$: ½, 1 |
| Kmin: 2 | Nmax: 16 | $\alpha_{VBR}$: ½ |

For the ABR sources, the following parameters are used: RIF=0.1, ICR (initial cell rate)=3 Mbps and PCR=150 Mbps.

Simulations are conducted with the following conditions. All sources starts at t=0 sec.

|   | MCR{ . . . } in Mbps | w[ . . . ] | Notes | Ideal FS in Mbps (before t = 0.125 sec) | Ideal FS in Mbps (after t = 0.125 sec) |
|---|---|---|---|---|---|
| A | 0.15 | 1 | greedy | 67.50 | 46.25 |
| B | 0.15 | 1 | rate-limited to 25 Mbps till t = 0.125 ec | 25+ | 46.25 |

-continued

| MCR{...} in Mbps | w[...] | Notes | Ideal FS in Mbps (before t = 0.125 sec) | Ideal FS in Mbps (after t = 0.125 sec) |
|---|---|---|---|---|
| C | 0.15 | 1 | rate-limited to 10 Mbps | 10+ | 10+ |
| D | 0.15 | 1 | rate-limited to 10 Mbps | 10+ | 10+ |
| E | 0.15 | 1 | rate-limited to 10 Mbps | 10+ | 10+ |
| F | 0.15 | 1 | rate-limited to 10 Mbps | 10+ | 10+ |
| G | 0.15 | 1 | rate-limited to 10 Mbps | 10+ | 10+ |

Figure 9A:
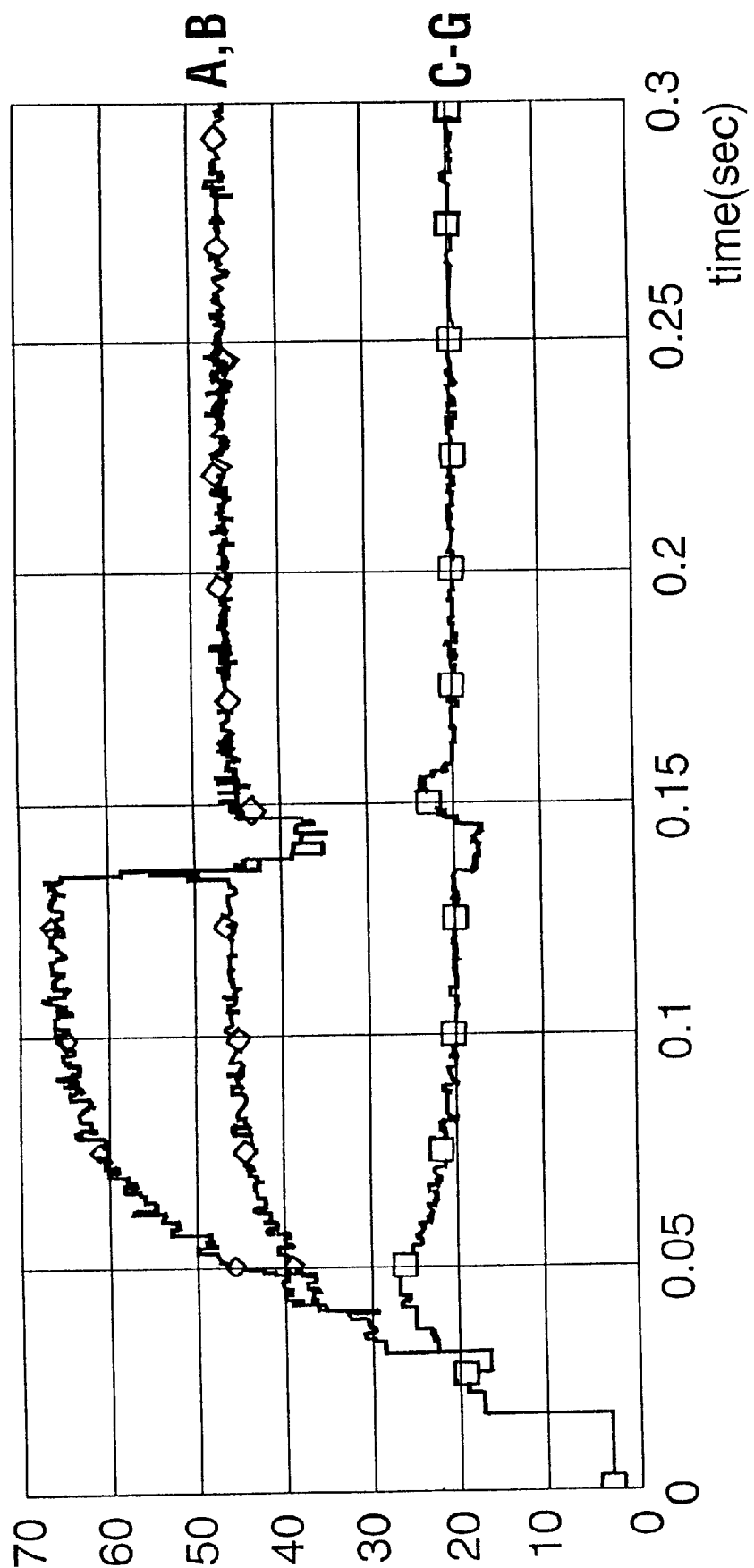
FIGS. 9a, 9b, 9c, 10a, 10b and 10c are results of simulation using the model shown in FIG. 5.
Figure 9B:
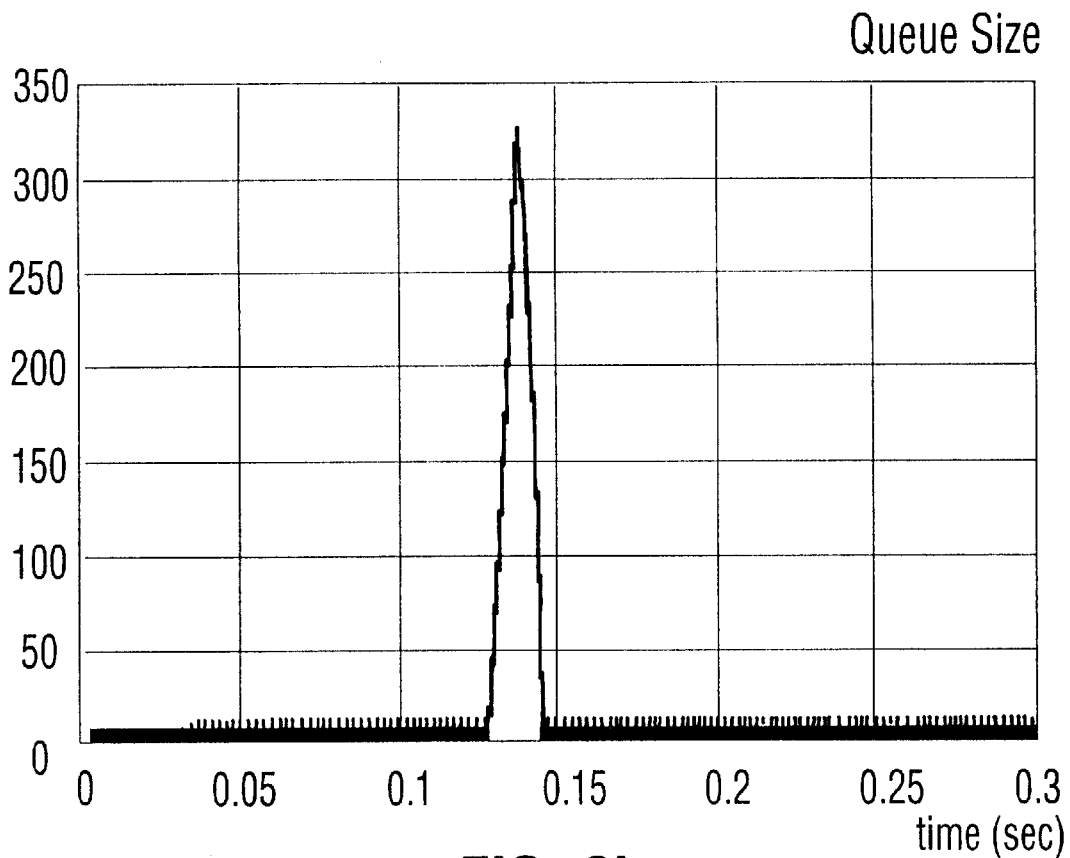
Figure 9C:
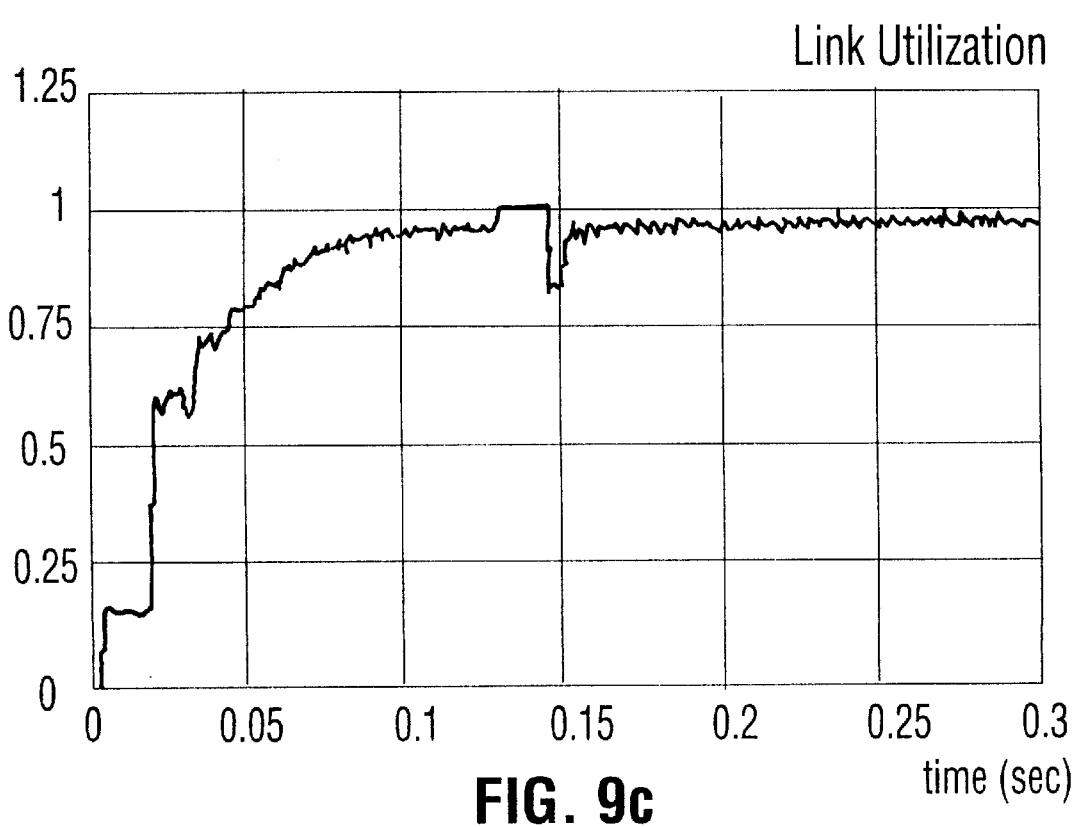
Figure 10A:
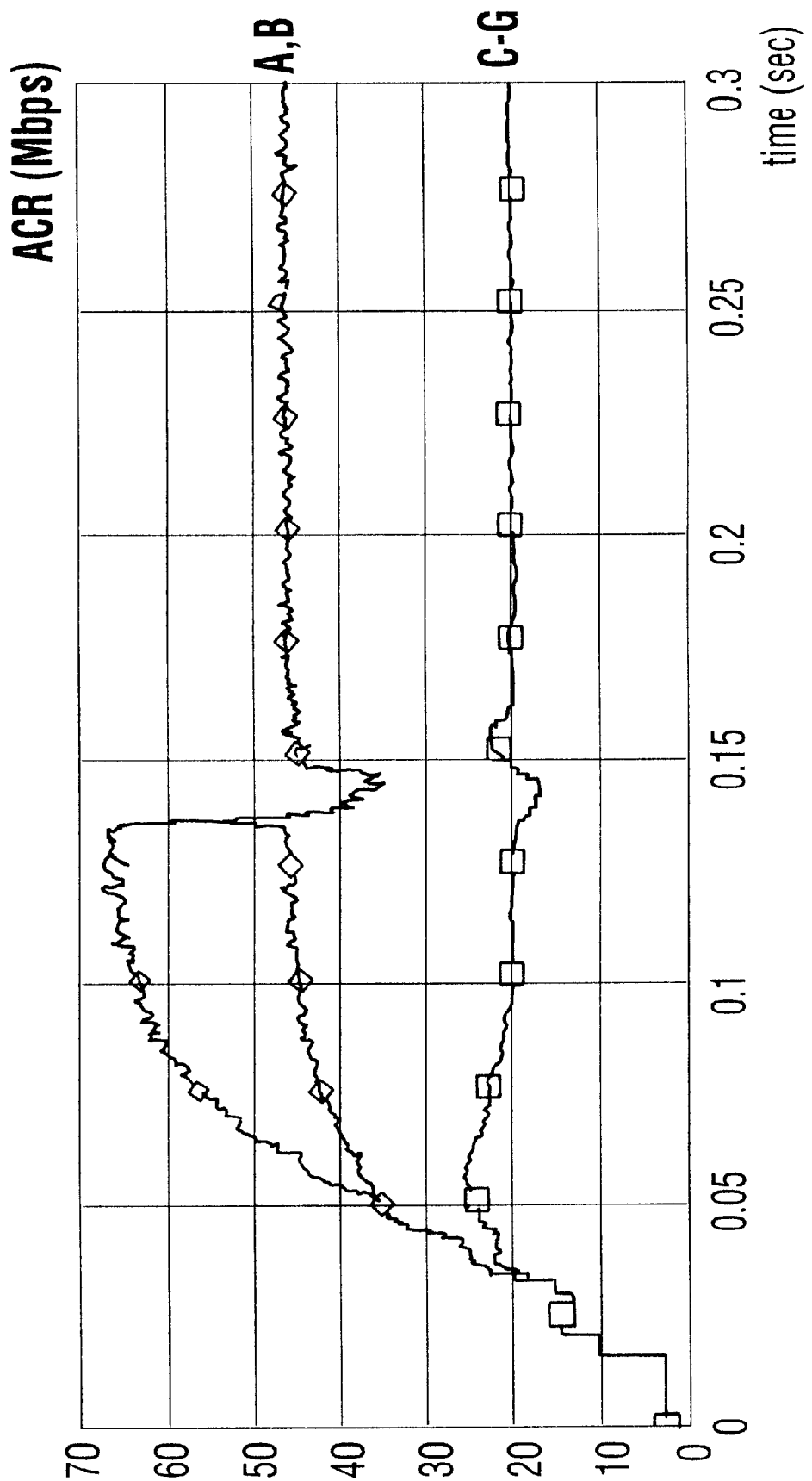
Figure 10B:
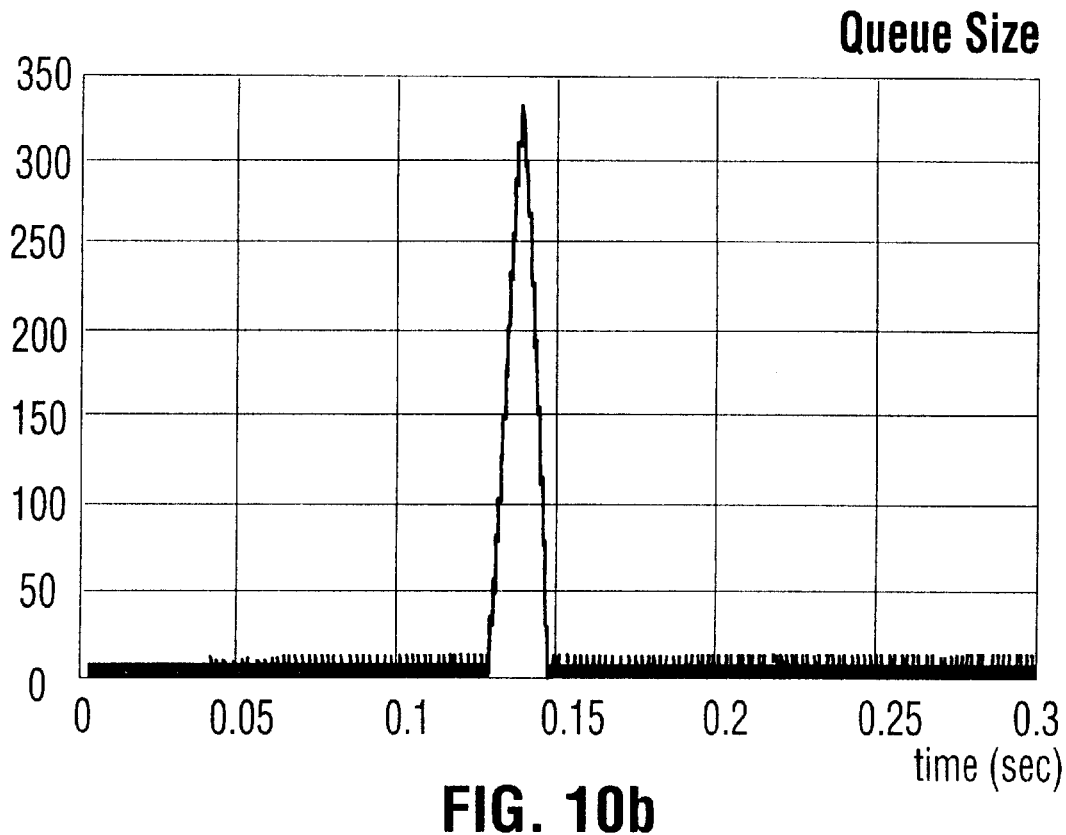
Figure 10C:
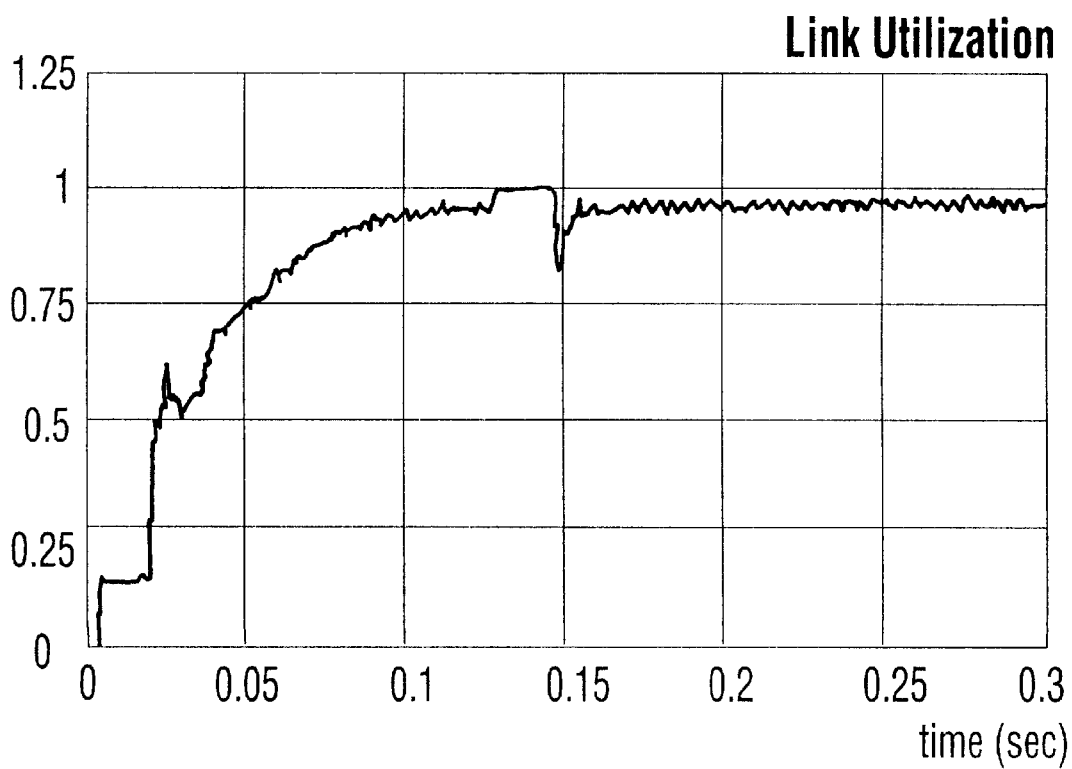

FIGS. 9a, 9b, and 9c are the results for $\alpha_{ER}=1$ (i.e., no ER smoothing), showing the ACR (allowed cell rate), queue size and link utilization respectively. FIGS. 10a, 10b, and 10c show the same parameters for the case of $\alpha_{ER}=\frac{1}{2}$. The results show that connections converge to their fair shares and that the peak queue size is very reasonable.

Figure 11:
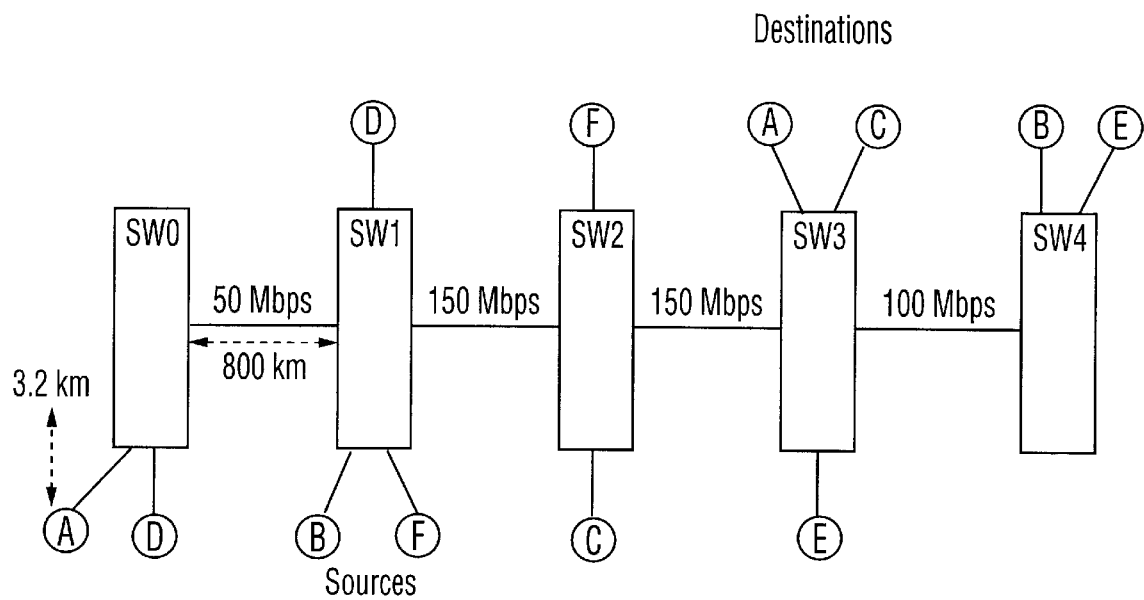
FIG. 11 is another simulation network model.

FIG. 11 shows another simulation set-up in which sources A–F are connected to destinations A–F as shown through switches SW0–SW4. Other parameters are shown in the figures.

All sources start rated limited to 10 Mbps till t=0.075 sec, then becomw greedy. Other source settings are as follows:

| MCR{...} in Mbps | w[...] | Ideal FS in Mbps (before t = 0.075 sec | Ideal FS in Mbps (after t = 0.075 sec) |
|---|---|---|---|
| A | 0.15 | 1 | 10+ | 23.75 |
| B | 0.15 | 1 | 10+ | 47.50 |
| C | 0.15 | 1 | 10+ | 71.25 |
| D | 0.15 | 1 | 10+ | 23.75 |
| E | 0.15 | 1 | 10+ | 47.50 |
| F | 0.15 | 1 | 10+ | 71.25 |

Figure 12A:
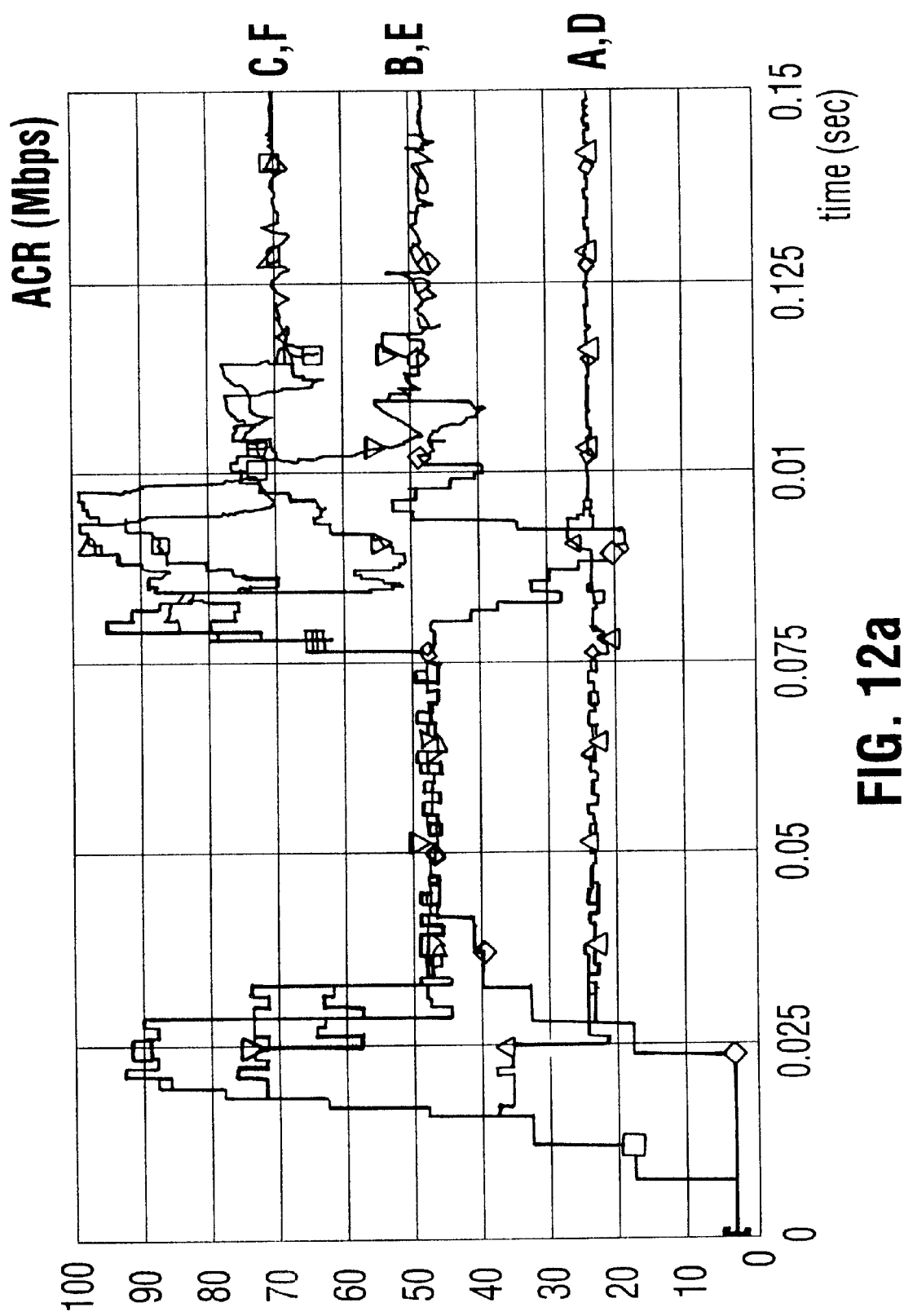
FIGS. 12a, 12b, 12c, 13a, 13b and 13c are results of simulation using the model shown in FIG. 12.
Figure 12B:
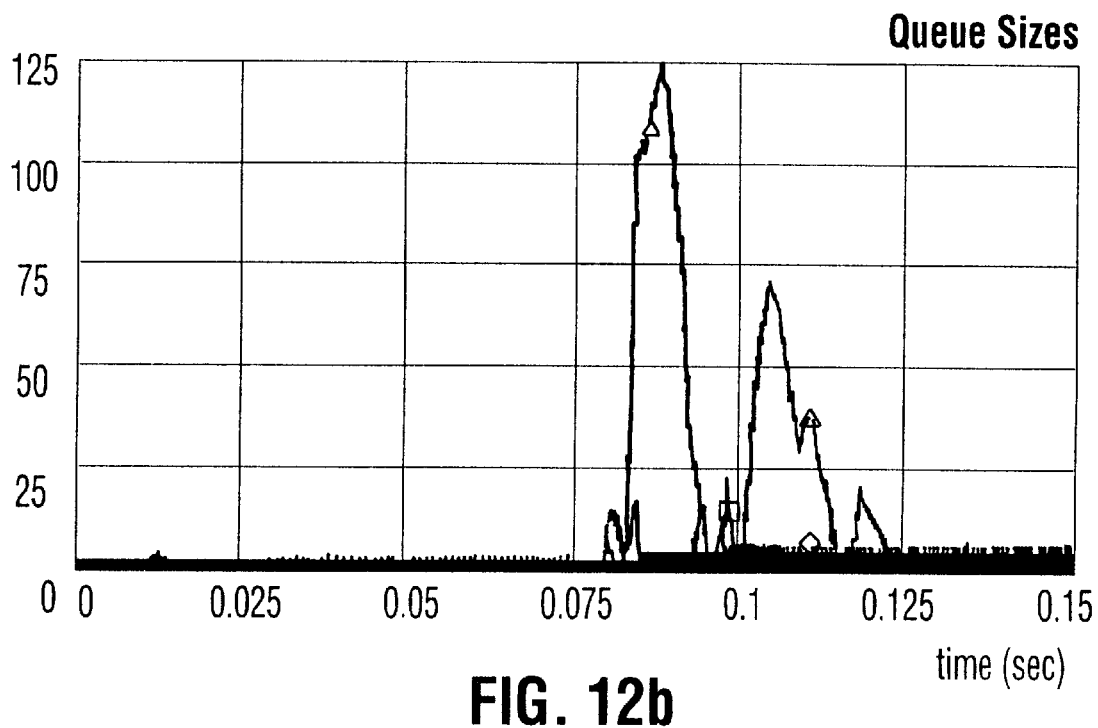
Figure 12C:
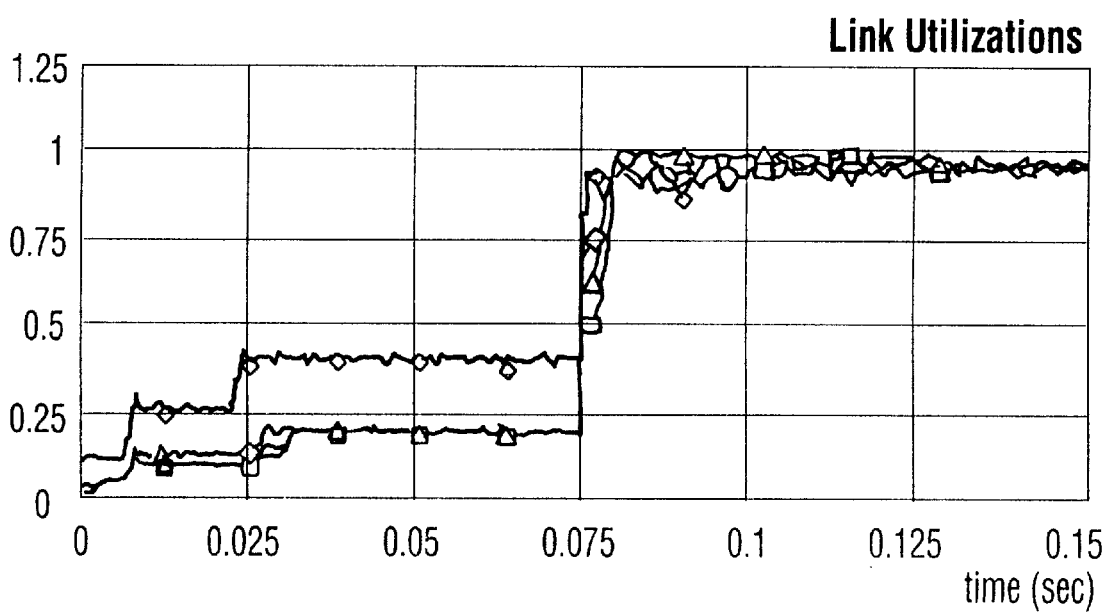
Figure 13A:
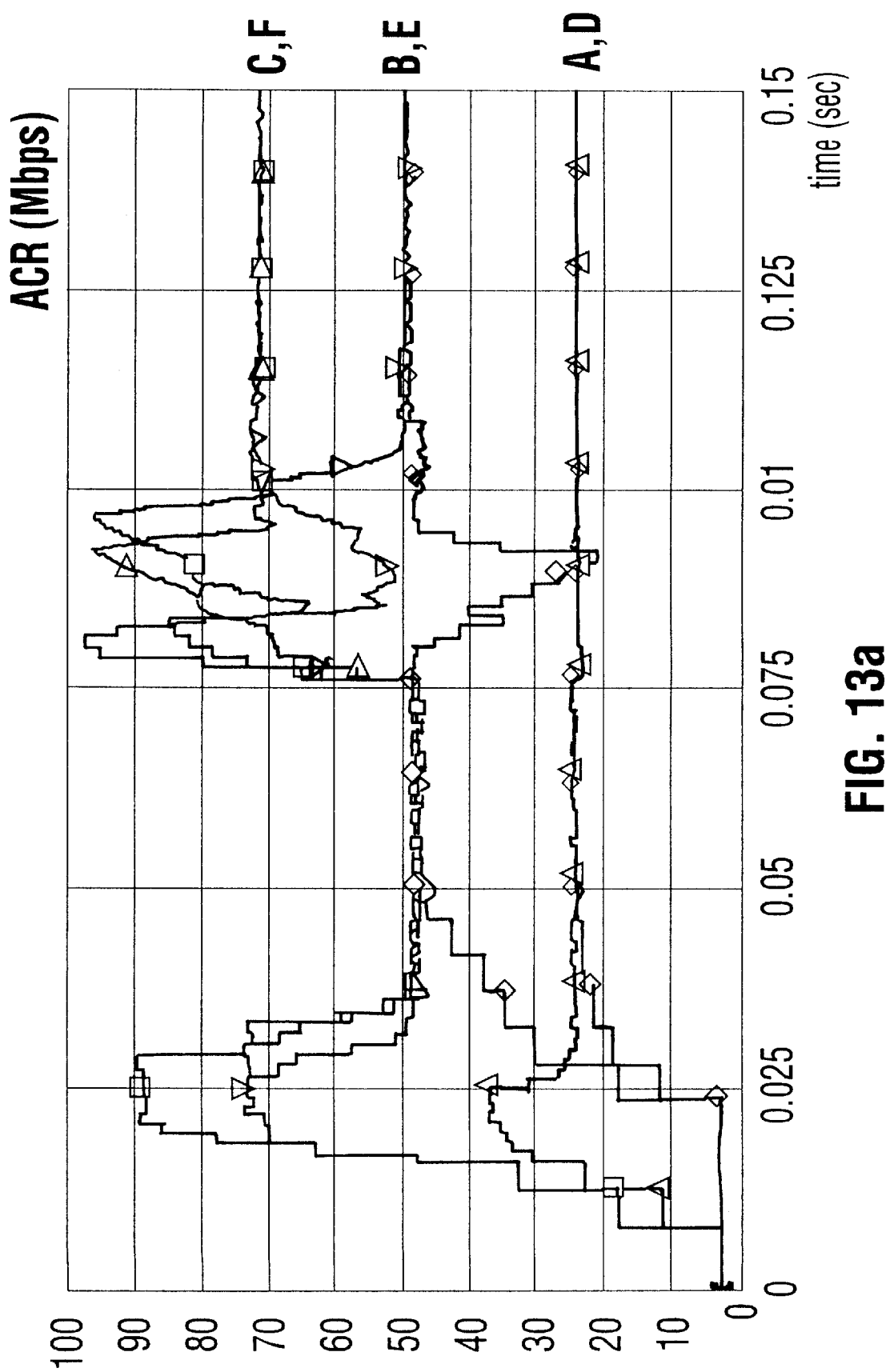
Figure 13B:
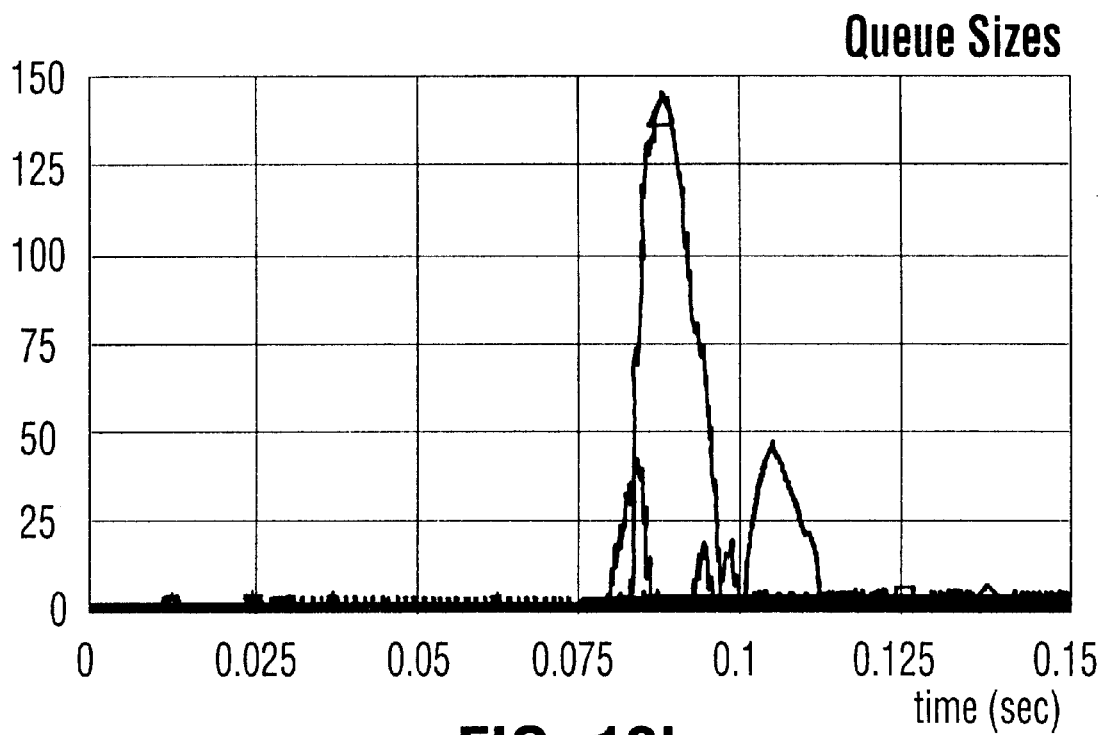
Figure 13C:
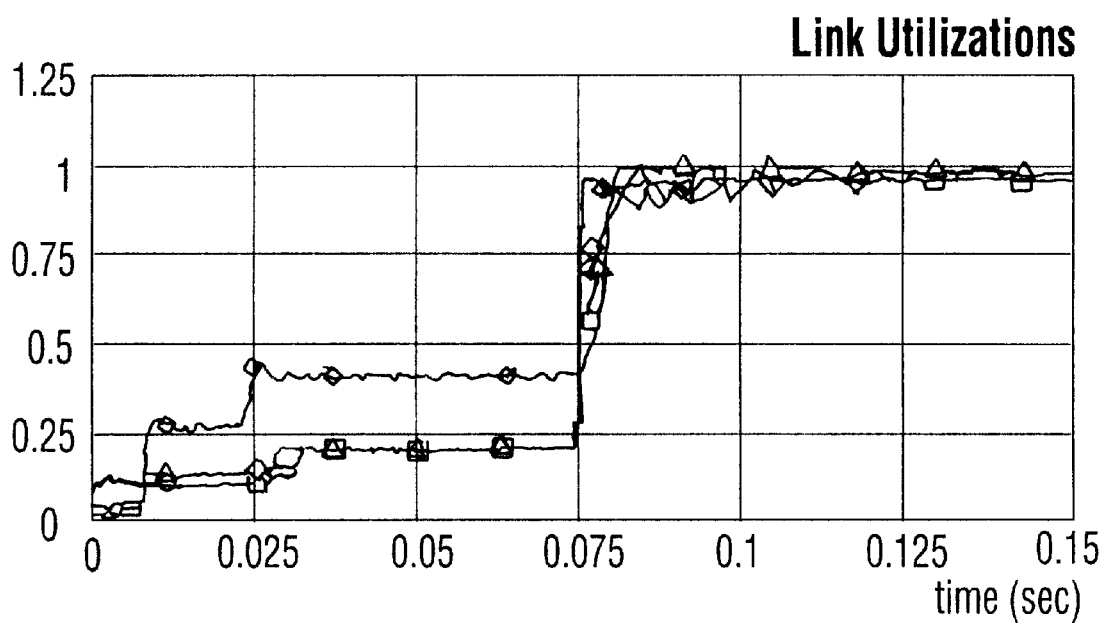

FIGS. 12a, 12b, and 12c are the results for $\alpha_{ER}=1$ (i.e., no ER smoothing), showing the ACR (allowed cell rate), queue size and link utilization respectively. FIGS. 13a, 13b, and 13c show the same parameters for the case of $\alpha_{ER}=\frac{1}{2}$. The simulation shows that when all sources change from lazy to active, they are able to acquire their ideal fair shares with very little impact on the queue sizes despite the fact that they all become active at the same time.

Figure 14:
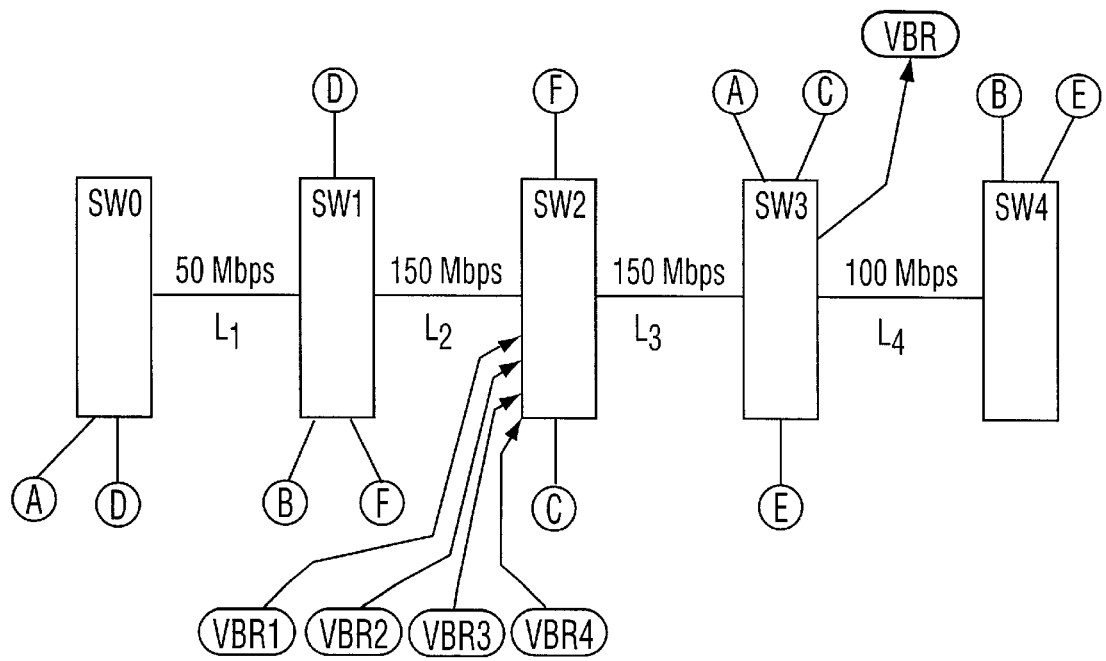
FIG. 14 is yet another simulation network model used to evaluate the algorithm.

FIG. 14 shows yet another simulation model which is similar to the one shown in FIG. 12 except that four VBR sources and VBR destination have been added to SW2 and SW3 respectively. All ABR sources are greedy and start at t=0 sec. They all have MCR=0.15 Mbps and w=1. VBR has absolute priority over ABR.

Without taking the queue sizes into account, the queue at SW2 appears to be growing without limit. The reason behind this instability may be the fact that we are using quite an aggressive VBR load coupled with n aggressive approach for implementing the target utilization TU. As an example, assume that TU=95% and that VBR is using 94% of the link bandwidth. According to our previous approach, ABR can target only TU-94%=1% of the link bandwidth. On the other hand, with our current approach, ABR targets (100–94%)*TU=5.7% of the link bandwidth.

The following statistics were collected for the aggregate VBR traffic on link L3 between t=0.1 sec and t=0.5 sec. the minimum VBR rate is 40 Mbps while the maximum rate reached 202 Mbps. The means rate is 128 Mbps with a variance of 718. It can be immediately seen that this is quite an aggressive VBR load especially when coupled with absolute VBR priority.

In all scenarios examined, smoothing ER has resulted in a smaller queue size at SW2. Even in the above scenario (where the queue continued to grow), the growth rate of the queue was significantly reduced.

Enabling the queue part of the algorithm of the invention at the per connection level, the ABR class level or both, resulted in keeping the queue sizes at very reasonable levels.

The queue part of the algorithm solved the queue growth problem without sacrificing the utilization of the links. The target utilization of 95% have been achieved for all links which didn't carry VBR, while link L3 approached a 100% utilization. The latter is consistent with our TU approach and the aggressive VBR traffic used.

What is claimed is:

1. In an ATM network carrying ABR traffic including ABR resource management cells called RM cells which carry explicit rate, hereinafter called ER, field and current cell rate, hereinafter called CCR, field, a method of controlling the ABR traffic flow by means of the RM cells for a virtual connection, hereinafter called VC, comprising steps of:

receiving and processing forward RM cells for the VC;

receiving and processing backward RM cells for the VC;

updating parameters either every time a backward RM cell for the VC is received or when a predetermined number of ABR cells for the VC are received, by keeping track of a maximum elastic input rate, hereinafter called MEIR, observed for a link under consideration, using a measured elastic input rate for the VC identified by [vc_no], the minimum cell rate, hereinafter called MCR [vc_no] for the VC identified by [vc_no] and a weight factor, hereinafter called w[vc_no] for the VC identified by [vc_no];

generating an explicit rate allocation to be placed in the ER field in a backward RM cell for the VC by using the updated parameters; and sending the backward RM cell for the VC containing the allocated rate in the ER field.

2. The method according to claim 1 wherein the elastic input rate EIR[vc_no] is calculated using the following equation:

$$\text{EIR}[vc\_no] = \alpha_{EIR} * \text{Actual\_Elastic\_Rate} + (1-\alpha_{EIR}) * \text{EIR}[vc\_no],$$

where EIR[vc_no] is the running exponential weighed average of the actual elastic rate seen on the VC, $\alpha_{EIR}$ is a weight used in smoothing EIR[vc_no].

3. The method according to claim 2, wherein actual elastic rate is generated as follows:

Actual_Elastic_Rate =
$$Nfwd[vc\_no]/[now - Tfwd[vc\_no]) - MCR[vc\_no]$$

where Nfwd[vc_no] is the number of cells received on the VC since its last input rate update and Tfwd[vc_no] is the time last input rate update was performed for the VC and now is the time that the measurement was taken.

4. The method according to claim 1, wherein the MEIR is not allowed to increase when a congestion is detected.

5. The method according to claim 4, wherein the MEIR is calculated by the following equations:

if $(EIR[vc\_no]/w[vc\_no] > MEIR$ and $UF > 1.0)$:

$MEIR = \alpha_{MEIR} * EIR[vc\_no]/w[vc\_no] + (1 - \alpha_{MEIR}) * MEIR$ else if $(UF < 1.0 - \delta_{UF})$:

$MEIR = \beta_{MEIR} * EIR[vc\_no]/w[vc\_no] + (1 - \beta_{MEIR}) * MEIR$ where UF is the underload factor of the link under consideration, $\alpha_{MEIR}$ is a weight used to smooth MEIR in the absence of congestion, $\beta_{MEIR}$ is the weight used to smooth MEIR when there is congestion, $\delta_{UF}$ is a parameter which defines the state of congestion.

6. The method according to claim 1 wherein the step of generating an explicit rate allocation for the VC[vc_no] is dependent upon a target rate defined by the following equation:

target rate=MEIR*w[vc_no]

where MEIR is the maximum elastic input rate observed for the link under consideration and w[vc_no] is the predetermined weight factor for the VC.

7. The method according to claim 6, wherein the explicit rate allocation is done in a manner that the more active a connection is, the more rate allocation it gets up to the target rate.

8. The method according to claim 7 further comprising a step of;
generating the explicit rate allocation to be placed in the ER field in a backward RM cell for the VC according to the following equation:

ERS=MCR[vc_no]+{EIR[vc_no]+(MEIR*w[vc_no]-EIR[vc_no])/K}UF where MCR[vc_no], w[vc_no], EIR[vc_no] and K are respectively minimum cell rate for the VC, an elastic input rate for the VC and an aggressiveness factor.

9. The method according to claim 8 wherein the aggressiveness factor K is dynamically adjustable based upon the traffic conditions.

10. The method according to claim 8, further comprising steps of: measuring the queue size of a buffer handling the VC and adjusting further ERS for the VC.

11. The method according to claim 10, wherein ERS is adjusted by the following equation ERS=ERS-(ERS-MCR[vc_no]*($q_{size}$[vc_no]-$q_{th}$)/($q_{capacity}$-$q_{th}$)

where $q_{size}$, $q_{th}$, and $q_{capacity}$ are respectively the length, the threshold and capacity of the queue for the VC.

12. The method according to claim 11 comprising further steps of: smoothing ER between two or more consecutive ER values.

13. The method according to claim 12 wherein the step of smoothing is done by the following equation:

ERS=$\alpha_{ER}$*ERS+(1-$\alpha_{ER}$)*Last_ER[vc_no]

where $\alpha_{ER}$ is a weight used in smoothing the rate given to the VC and the Last_ER is the last ER given to the VC.

14. The method according to claim 1, further including a measuring step which comprises steps of:
every T seconds, T being a preset period,
measuring the queue size of a buffer which is handling the VC,
calculating a current target utilization of the link under consideration, $TU_{current}$, and
determining the underload factor UF by using the size of queue and $TU_{current}$.

15. The method according to claim 14 wherein the steps of calculating the $TU_{current}$ is carried out by the following equation, if $(Q_{size} > Q_{th})$ $TU_{current} = TU - (TU - TU_{min})*(Q_{size} - Q_{th})/Q_{capacity} - Q_{th})$ else $T_{Ucurrent} = TU$ where $Q_{size}$, $Q_{th}$, $Q_{capacity}$ and $TU_{min}$ are respectively the current number of queued ABR cells, ABR class queue threshold, ABR class queue capacity and the minimum target utilization of the link under consideration.

16. The method according to claim 15 wherein Rate_Available_to_ABR is calculated as follows:

Rate_Available_To_ABR=max{0, Link Speed-VBR_Rate}*$TU_{current}$ where the Link Speed and VBR_Rate are respectively the speed of the link under consideration and smoothed VBR rate.

* * * * *

UNITED STATES PATENT AND TRADEMARK OFFICE
CERTIFICATE OF CORRECTION

PATENT NO. : 5,991,268

DATED : November 23, 1999

INVENTOR(S) : AWDEH, Raed Y.; and PILLAR, John Frank

It is certified that error appears in the above-identified patent and that said Letters Patent is hereby corrected as shown below:

On page 7, line 63:
    Delete --5,734,-- and insert "5,754,"

Signed and Sealed this

Thirty-first Day of October, 2000

Attest:

Attesting Officer

Q. TODD DICKINSON

Director of Patents and Trademarks